US012457933B2

(12) United States Patent
Singh et al.

(10) Patent No.: US 12,457,933 B2
(45) Date of Patent: Nov. 4, 2025

(54) SYSTEMS AND METHODS FOR INITIAL HARVEST PATH PREDICTION AND CONTROL

(71) Applicant: Deere & Company, Moline, IL (US)

(72) Inventors: Rana Shakti Singh, Kaimur (IN);
Bradley K. Yanke, Eldridge, IA (US);
Stephen R. Corban, Geneseo, IL (US);
Federico Pardina-Malbran, Fort Collins, CO (US)

(73) Assignee: Deere & Company, Moline, IL (US)

( * ) Notice: Subject to any disclaimer, the term of this patent is extended or adjusted under 35 U.S.C. 154(b) by 75 days.

(21) Appl. No.: 18/620,506

(22) Filed: Mar. 28, 2024

(65) Prior Publication Data

US 2025/0301953 A1    Oct. 2, 2025

(51) Int. Cl.
*G05D 1/69*     (2024.01)
*A01D 41/127*   (2006.01)
(Continued)

(52) U.S. Cl.
CPC ......... *A01D 41/1275* (2013.01); *A01D 90/10* (2013.01); *G05D 1/2469* (2024.01);
(Continued)

(58) Field of Classification Search
CPC .... A01D 41/1275; A01D 90/10; G05D 1/667; G05D 1/648; G05D 1/69; G05D 1/2469;
(Continued)

(56) References Cited

U.S. PATENT DOCUMENTS 6,943,824 B2   9/2005  Alexia et al.
7,167,797 B2   1/2007  Faivre et al.
(Continued)

OTHER PUBLICATIONS

Khan et al., Overview of Emerging Technologies for Improving the Performance of Heavy-Duty Construction Machines, 2022, IEEE, p. 1-22 (Year: 2022).*

(Continued)

*Primary Examiner* — Mcdieunel Marc
(74) *Attorney, Agent, or Firm* — Kelly, Holt & Christenson; Joseph R. Kelly

(57) ABSTRACT

A computer implemented method includes obtaining historical operation data relative to a plurality of historical operations, the historical operation data including historical machine data, historical worksite data, historical productivity data, and historical logistics data; obtaining current operation data relative to an underway or upcoming operation, the current operation data including current machine data and current worksite data; generating, based on the obtained historical operation data and the obtained current operation data, an operation plan output relative to the underway or upcoming operation, the operation plan output including one or more of: (i) one or more machine routes; (ii) one or more sub-operation locations; (iii) one or more operation plan maps; or a combination of (i), (ii), and (iii); and generating control signals to control one or more mobile agricultural work machines based on the operation plan output.

20 Claims, 13 Drawing Sheets

(51) Int. Cl.
  *A01D 90/10* (2006.01)
  *G05D 1/246* (2024.01)
  *G05D 1/648* (2024.01)
  *G05D 1/667* (2024.01)
  *G06Q 50/02* (2012.01)
  *G05D 105/15* (2024.01)
  *G05D 107/20* (2024.01)

(52) U.S. Cl.
  CPC ............. *G05D 1/648* (2024.01); *G05D 1/667* (2024.01); *G05D 1/69* (2024.01); *G06Q 50/02* (2013.01); *G05D 2105/15* (2024.01); *G05D 2107/21* (2024.01)

(58) Field of Classification Search
  CPC . G05D 2105/15; G05D 2107/21; G06Q 50/02
  See application file for complete search history.

(56) References Cited

U.S. PATENT DOCUMENTS

| | | | |
|---|---|---|---|
| 7,725,233 B2 | 5/2010 | Hendrickson et al. | |
| 8,060,283 B2 | 11/2011 | Mott et al. | |
| 8,195,342 B2 | 6/2012 | Anderson | |
| 8,195,358 B2 | 6/2012 | Anderson | |
| 8,224,500 B2 | 7/2012 | Anderson | |
| 8,229,618 B2 | 7/2012 | Tolstedt et al. | |
| 8,392,065 B2 | 3/2013 | Tolstedt et al. | |
| 8,437,901 B2 | 5/2013 | Anderson | |
| 8,478,493 B2 | 7/2013 | Anderson | |
| 8,639,408 B2 | 1/2014 | Anderson | |
| 8,738,238 B2 | 5/2014 | Rekow | |
| 8,818,567 B2 | 8/2014 | Anderson | |
| 8,989,972 B2 | 3/2015 | Anderson | |
| 9,188,980 B2 | 11/2015 | Anderson | |
| 9,232,687 B2 * | 1/2016 | Bassett | A01C 7/203 |
| 9,235,214 B2 | 1/2016 | Anderson | |
| 10,231,376 B1 * | 3/2019 | Stanhope | F16M 13/022 |
| 10,597,235 B2 * | 3/2020 | Clucas | B65G 67/02 |
| 10,813,265 B2 * | 10/2020 | Stanhope | A01B 69/007 |
| 11,178,818 B2 | 11/2021 | Brammeier et al. | |
| 11,240,961 B2 | 2/2022 | Anderson et al. | |
| 11,499,295 B2 | 11/2022 | Anderson | |
| 11,602,093 B2 * | 3/2023 | Stanhope | A01B 69/008 |
| 11,624,829 B2 * | 4/2023 | Dasika | A01B 69/001 356/4.01 |
| 11,674,288 B2 | 6/2023 | Anderson et al. | |
| 12,069,978 B2 * | 8/2024 | Vandike | G05B 13/048 |
| 12,310,285 B2 * | 5/2025 | Meyers | A01D 41/127 |
| 2020/0128738 A1 | 4/2020 | Suleman et al. | |
| 2022/0122197 A1 | 4/2022 | Hanrieder | |
| 2023/0320274 A1 * | 10/2023 | Vandike | G06V 20/56 701/50 |
| 2024/0049633 A1 * | 2/2024 | Vandike | A01D 41/127 |
| 2024/0049634 A1 * | 2/2024 | Vandike | A01D 90/10 |
| 2024/0049635 A1 * | 2/2024 | Vandike | A01D 41/127 |
| 2024/0049636 A1 * | 2/2024 | Vandike | G05D 1/6985 |
| 2024/0244996 A1 * | 7/2024 | Vandike | A01D 41/1243 |
| 2025/0048964 A1 * | 2/2025 | Farley | A01D 41/127 |

OTHER PUBLICATIONS

Misra et al., IoT, Big Data, and Artificial Intelligence in Agriculture and Food Industry, 2020, IEEE, p. 6305-6324 (Year: 2020).*
Lamrhari et al., A profile-based Big data architecture for agricultural context, 2016, IEEE, p. 1-6 (Year: 2016).*
Sigrimis et al., Advances in control of agriculture and the environment, 2001, IEEE, p. 8-12 (Year: 2001).*

* cited by examiner

SYSTEMS AND METHODS FOR INITIAL HARVEST PATH PREDICTION AND CONTROL

FIELD OF THE DESCRIPTION

The present description relates to worksite operations. More specifically, the present description relates to controlling worksite operations, such as agricultural operations at agricultural worksites.

BACKGROUND

There are a wide variety of different types of worksite operations. Some such worksite operations include agricultural worksite operations. Agricultural worksite operation architectures can include a plurality of mobile agricultural work machines that operate at one or more agricultural worksites, such as one or more fields, to perform one or more agricultural worksite operations. The plurality of mobile agricultural work machines can be controlled to coordinate the performance of the one or more agricultural worksite operations in an effort to distribute the mobile agricultural work machines to complete the one or more agricultural worksite operations efficiently.

The discussion above is merely provided for general background information and is not intended to be used as an aid in determining the scope of the claimed subject matter.

SUMMARY

A computer implemented method includes obtaining historical operation data relative to a plurality of historical operations, the historical operation data including historical machine data, historical worksite data, historical productivity data, and historical logistics data; obtaining current operation data relative to an underway or upcoming operation, the current operation data including current machine data and current worksite data; generating, based on the obtained historical operation data and the obtained current operation data, an operation plan output relative to the underway or upcoming operation, the operation plan output including one or more of: (i) one or more machine routes; (ii) one or more sub-operation locations; (iii) one or more operation plan maps; or a combination of (i), (ii), and (iii); and generating control signals to control one or more mobile agricultural work machines based on the operation plan output.

An agricultural system includes: one or more processors; and memory storing instructions, executable by the one or more processors, that, when executed by the one or more processors, cause the one or more processors to perform steps comprising: obtaining historical operation data relative to a plurality of historical operations, the historical operation data including historical machine data, historical worksite data, historical productivity data, and historical logistics data; obtaining current operation data relative to an underway or upcoming operation at a worksite, the current operation data including current machine data and current worksite data; generating an operation plan output relative to the underway or upcoming operation based on the obtained historical operation data and the obtained current operation data, the operation plan output including one or more of: (i) one or more machine routes; (ii) one or more sub-operation locations; (iii) one or more operation plan maps of the worksite; or a combination of (i), (ii), and (iii); and generating control signals to control one or more mobile agricultural work machines based on the operation plan output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
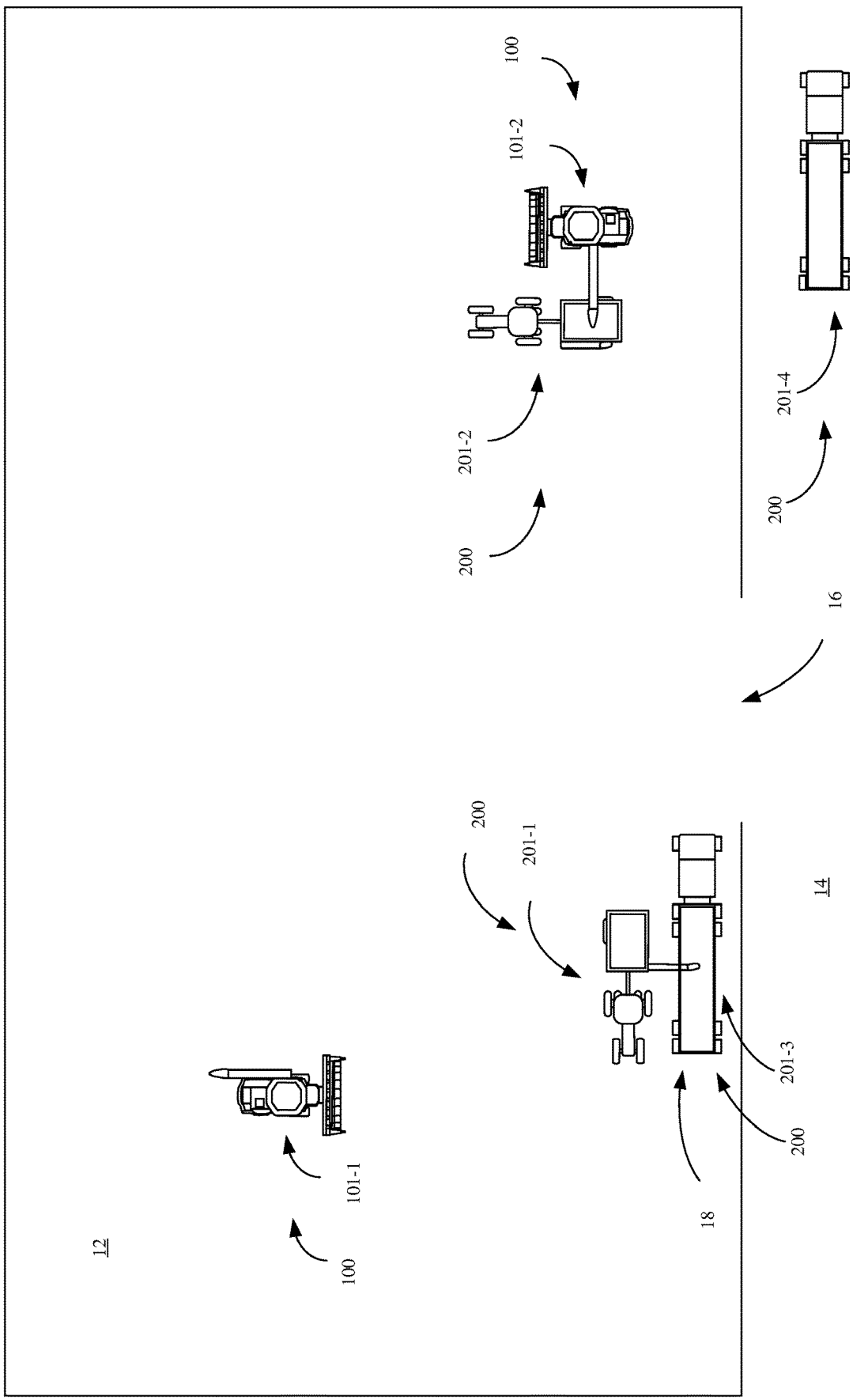
FIG. 1 is a pictorial illustration showing an example agricultural worksite operation at an example agricultural worksite.

For the purpose of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

An agricultural worksite operation system architecture can include a variety of different mobile agricultural work machines that operate at one or more agricultural worksites (e.g., one or more fields) to perform one or more agricultural worksite operations. For example, an agricultural worksite operation system architecture can include a variety of different mobile agricultural work machines that operate at one or more fields to perform an agricultural worksite operation.

One type of agricultural worksite operation is a harvesting operation. During a harvesting operation, one or more mobile agricultural harvesting machines harvest crop at one or more fields. One or more mobile material receiving machines, such as mobile grain carts (e.g., towed grain carts) and mobile grain trailers (e.g., towed grain trailers), coordinate to receive harvested material from the mobile agricultural harvesting machines and to transport the harvested material from the one or more fields to a delivery location (e.g., dryer, storage location, purchasing facility, such as a grain mill, etc.).

As an agricultural harvester harvests crop at a field, clean grain is loaded into a grain tank on-board the agricultural harvester. A mobile material receiving machine, such as a mobile grain cart, is controlled to rendezvous with the agricultural harvester such that the harvested material can be transferred from the grain tank on-board the agricultural harvester to the material receptacle of the mobile grain cart. Ideally, the transferring begins when the on-board grain tank is full (at least to a threshold level) and takes place while the agricultural harvester continues to travel and harvest crop. Transferring while on the move is sometimes referred to as an in-tandem material transfer operation (or in-tandem unloading operation). Once the agricultural harvester has been emptied or has otherwise transferred a desired amount of material, or otherwise needs to end material transfer (e.g., prior to an upcoming turn), the mobile grain cart will travel to another location, such as to another mobile material receiving machine (e.g., a mobile grain trailer) or to another location, to transfer the grain from the material receptacle of the mobile grain cart to another location (e.g., material receptacle of the mobile grain trailer, or another location). The mobile grain cart, once emptied, will then be available to again rendezvous with the agricultural harvester (or to rendezvous with another agricultural harvester) to receive more harvested material. Generally, the mobile grain trailer remains parked at one location (e.g., an unloading location) on the field during the operation (except for when moving to get into position or moving to leave the field). Ideally, the unloading location at which the mobile grain trailer is positioned is close to an entrance/exit of the field and accommodates the size and turn radius of the towed grain trailer and minimizes potential damage (e.g., compaction, etc.) to the field. Eventually, the mobile grain trailer will become full (at least to a desired level) and will leave the field to deliver material to another location and is either replaced by another towed grain trailer or returns to the field after delivering material, or both. This logistical scheme continues until the harvesting operation at the field is complete.

Ideally, the agricultural harvesting operation is performed without any downtime for the agricultural harvesters. However, it can be difficult to efficiently schedule and control the material receiving machines to rendezvous with the agricultural harvesters at the ideal times (such that material transfer can begin when the agricultural harvester is full, or even slightly before full). When an agricultural harvester becomes full without a material receiving machine available for material transfer, the agricultural harvester will stop harvesting and wait for a material receiving machine to become available. This downtime increases the cost of the operation and may lead to other deleterious effects. In some examples the agricultural harvester does not stop and, as a result, grain may spill out onto the ground.

There may only be short windows of time during which ideal harvesting (e.g., harvesting crop when the crop is at desired moisture levels) can be completed. Downtime for the agricultural harvesters reduces the amount of crop that can be harvested during the short windows of time and can lead to more crop being harvested at less than ideal times (e.g., when the crop is not at desired moisture levels). A seller (e.g., grower, etc.) can be docked (i.e., paid less money) by a purchasing facility for harvested crop that is outside a desired moisture range. Thus, the seller will either make less money at the purchasing facility or will be required to run the crop through a dryer to bring the crop within the desired moisture range. Running the dryer increases costs. Crop that is too dry (i.e., is below the desired moisture range), will result in less pay from the purchasing facility. The purchasing facility pays for crop by weight. Crop that is less moist will weigh less than the same crop that is moister. As the purchasing facility is willing to pay full price for any crop within a given moisture range, it is best to have the crop at the top end of that given moisture range (for purposes of weight) or at least within the range so as not to be docked or to have less payable weight for the same crop. This is merely one example of a deleterious effect that may result from downtime during a harvesting operation.

In other examples, instead of harvesting crop at less than ideal times, harvesting may be delayed, increasing the operation window by hours, days, or weeks, which can increase costs, increase machine wear, and may, ultimately, result in poor crop in any case (e.g., if weather does not cooperate).

The location of the mobile grain trailers can impact the efficiency of the harvesting operation. Ideally, mobile grain trailers are parked at locations that are efficient for both the mobile grain trailers and efficient for the mobile grain carts hauling material to the mobile grain trailers. For example, if the mobile grain trailers are parked further away from the field entrance/exit (e.g., in an effort to be closer to the harvester(s)) it may take longer for the mobile grain trailers to leave and return to the field. Additionally, these closer locations may be more likely to cause damage (e.g., compaction to the field) or result in the mobile grain trailers getting stuck (thus increasing downtime). In another example, if the mobile grain trailers are parked closer to the field entrance/exit it may take longer for the mobile grain carts to reach the mobile grain trailers, unload, and travel back to a harvester to receive more material which may lead to increased downtime of a harvester.

Additionally, the harvest routes (including turn patterns) of the one or more harvesters can have an impact on the efficiency of the harvesting operation. Where multiple harvesters are utilized, the route of each harvester should be coordinated with the route of other harvester(s) to provide coverage of the field while minimizing downtime (e.g., waiting for another harvester or other machine to get out of the way), minimizing overlap (e.g., headers of the separate harvesters traveling over the same locations), and accounting for the operation of the material transfer machines. For example, the initial path of harvesters (e.g., the first harvesting path of a first harvesting route at a field, sometimes called an opening track or opening path) may need to be planned to ensure that material receiving machines can get onto and travel the field and in order to minimize the travel of the mobile grain cart(s) between the harvester(s) and the mobile grain trailer(s).

It can be difficult for operation managers (e.g., grower, owner, operators, etc.) to plan an agricultural harvesting operation. Additionally, it can be difficult for operation managers to adjust the plan during the operation due to deviations from the plan that occur during the operation. The present discussion proceeds with example systems and methods that can generate plan outputs that provide one or more of sub-operation location locations (e.g., material receiving machine unload locations—that is, the location(s) at which mobile grain carts are to receive material and the location(s) at which mobile grain trailers are to receive material) and routes (e.g., harvest routes, including turn patterns and initial harvesting paths and material transfer machine routes, including, initial paths for mobile grain carts). The systems and methods utilize historical operation data and current operation data to generate the plan outputs, which can be provided for control of one or more mobile agricultural work machines (e.g., one or more harvesters, one or more mobile grain carts, and one or more mobile grain trailers).

It will be understood that while various examples detailed herein proceed in the context of agricultural harvesting operation and agricultural work machines used in an agricultural harvesting operation, the systems and methods described herein are applicable to and can be used in various other types of agricultural worksite operation and agricultural work machines, such as, but not limited to, planting operations and machines used in a planting operation (e.g., mobile agricultural planters and mobile seed/product tender machines), a product application operation (e.g., spraying or dry spreading) and machines used in product application (e.g., mobile agricultural sprayers/mobile agricultural dry spreaders, product tender machines), as well as with other types of operations and machines. Additionally, it will be understood that while various example herein proceed in the context of agricultural harvesters in the form of combine harvesters, the systems and methods described herein are applicable to and can be used in various other types of agricultural harvesters, such as, but not limited to, forage harvesters, windrowers, etc.

FIG. 1 is a pictorial illustration showing an example agricultural worksite operation. FIG. 1 illustrates an example harvesting operation in which a plurality mobile agricultural work machines carry out a harvesting at an example field 12. Field 10 includes a field entrance/exit 16 useable by the mobile agricultural work machines to enter and exit field 10. The mobile agricultural work machines shown in FIG. 1 include a plurality of mobile work machines (mobile agricultural work machines) including a plurality of mobile primary work machines 100 (shown as agricultural harvesters 101 (illustratively 101-1 and 101-2)), a first plurality of mobile support machines 200 (shown as material receiving machines 201 (illustratively 201-1 and 201-1) in the form of mobile grain carts (illustratively towed grain carts)), and a second plurality of mobile support machines 200 (shown as material receiving machines 201 (illustratively 201-3 and 201-4) in the form of mobile grain trailers (illustratively towed grain trailers, sometimes referred to as grain trucks)).

In other example agricultural worksite operations other types of mobile agricultural work machines carry out an operation. For instance, in a planting operation, one or more mobile primary work machines (in the form of mobile planters (e.g., row planters, air seeders, etc.)) plant crop at a field and one or more mobile support machines (in the form of seed and/or product tender vehicles) carry product and rendezvous with the planters to deliver seed and/or product to the mobile planters. In another example, in a product application operation, one or more mobile primary work machines (in the form of mobile product application machines (e.g., mobile sprayers, mobile dry spreaders, etc.)) apply product (e.g., herbicide, pesticide, fertilizer, etc.) at a field and one or more mobile support machines (in the form of product tender vehicles) carry product and rendezvous with the mobile product application machines to deliver product to the mobile product application machines. These are merely some examples.

As can be seen in FIG. 1, harvesters 101 travel the field and harvest crop. A mobile grain cart 201-2 is shown traveling in tandem with harvester 101-2 and receiving harvested material from the harvester 101-2. A mobile grain trailer 200-3 is shown parked at an unload location 18. A mobile grain cart 200-1 is shown located relative to the unload location 18 (and thus the mobile grain trailer 200-3) to unload material (collected from a harvester, such as harvester 100-1) into mobile grain trailer 200-3. Additionally, as shown in FIG. 1, a mobile grain trailer 200-4 is shown traveling away from field 12 on a road 14. The mobile grain trailer 200-4, having been previously parked at the unload location 18 and filled (at least to a threshold level) by one or both 3 of mobile grain carts 200-1 and 200-2 leaves the field 12 and travels road 14 to a delivery location (e.g., dryer, storage bin, grain mill, etc.).

Figure 2:
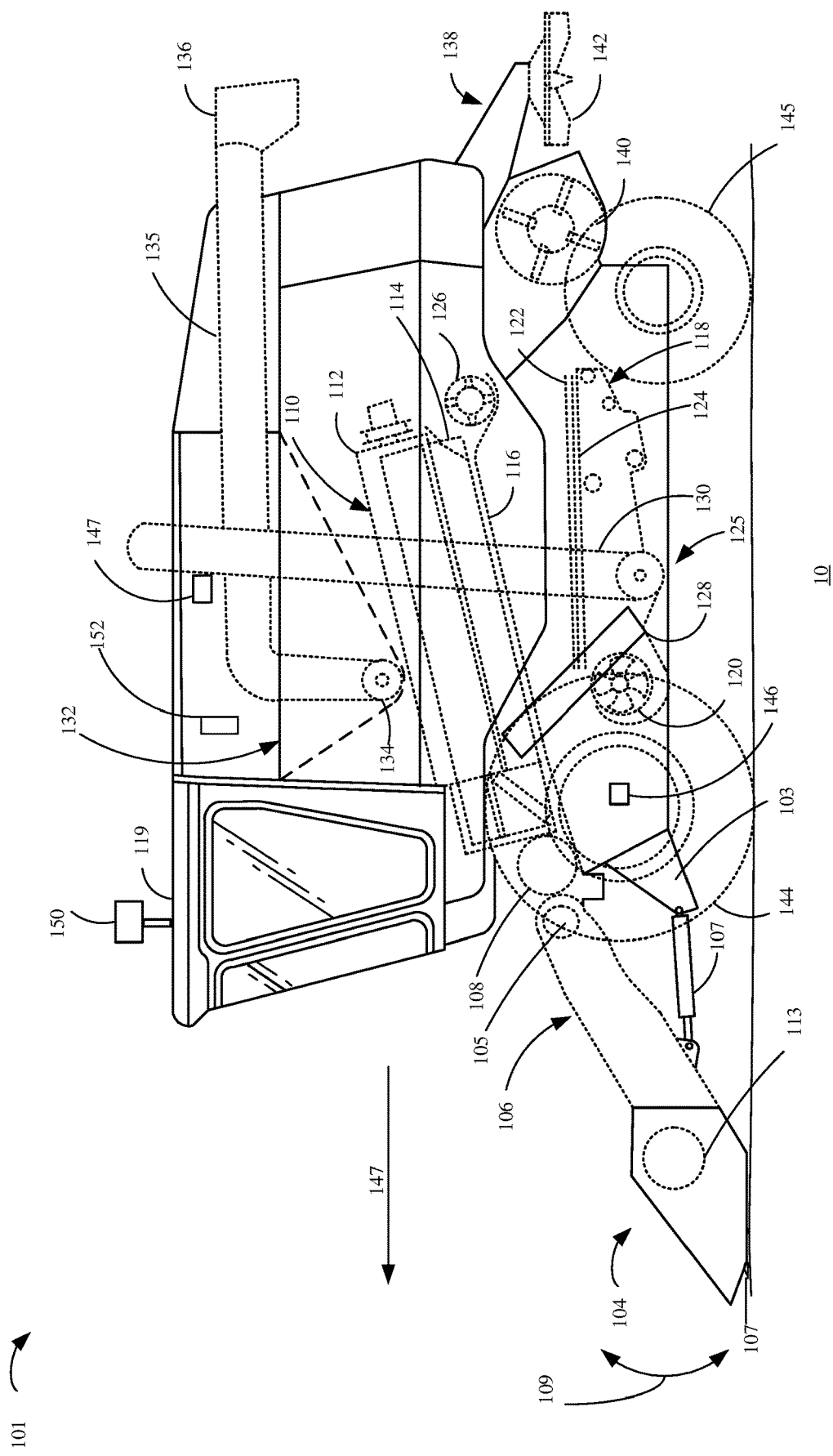
FIG. 2 is a partial pictorial, partial schematic illustration showing an example agricultural harvester.

FIG. 2 is partial pictorial, partial schematic illustration of an example agricultural harvester 101. In the example shown in FIGS. 1-2, agricultural harvester is in the form of a combine harvester. As illustrated in FIG. 2, harvester 101 includes ground engaging traction elements (wheels or tracks) 144 and 145 which can be driven by a propulsion subsystem (e.g., motor or engine and other drivetrain elements, such as a gear box) to propel harvester 101 across a worksite 10 (e.g., a field). Harvester 101 includes an operator compartment or cab 119, which can include a variety of different operator interface mechanisms (e.g., 418 shown in FIG. 4) for controlling harvester 101 as well as for presenting (e.g., displaying, etc.) various information. Harvester 101 includes a feeder house 106, a feed accelerator 108, and a thresher generally indicated at 110. The feeder house 106 and the feed accelerator 108 form part of a material handling subsystem 125. Header 104 is pivotally coupled to a frame 103 of harvester 101 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, agricultural harvester 101 may also include one or more actuators that operate to apply a tilt angle, a roll angle, or both to the header 104 or portions of header 104.

Agricultural harvester 101 includes a material handling subsystem 125 that includes a thresher 110 which illustratively includes a threshing rotor 112 and a set of concaves 114. Further, material handling subsystem 125 also includes a separator 116. Agricultural harvester 101 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator moves clean grain into a material receptacle (or clean grain tank) 132.

Harvester 101 also includes a material transfer subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger or blower. Conveying mechanism 134 is in communication with clean grain tank 132 and is driven (e.g., by an actuator, such as motor or engine) to convey material from grain tank 132 through chute 135 and spout 136. Chute 135 is rotatable through a range of positions from a storage position (shown in FIG. 2) to a variety of deployed positions away from agricultural harvester 100 to align spout 136 relative to a material receptacle of a material receiving machine 200 that is configured to receive the material within grain tank 132. One example of such a deployed position is shown in FIG. 1. Spout 136, in some examples, is also rotatable, by an actuator, to adjust the direction of the material stream exiting spout 136.

Harvester 101 also includes a residue subsystem 138 that can include chopper 140 and spreader 142. In some examples, a harvester within the scope of the present disclosure May have more than one of any of the subsystems mentioned above. In some examples, harvester 100 may have left and right cleaning subsystems, separators, etc., which are not shown in FIG. 1.

In operation, and by way of overview, harvester 101 illustratively moves through a field 10 in the direction indicated by arrow 147. As harvester 100 moves, header 104 engages the crop plants to be harvested and cuts, with a cutter bar 107 on the header 104, the crop plants to generate cut crop material.

The cut crop material is engaged by a cross auger 113 which conveys the severed crop material to a center of the header 104 where the severed crop material is then moved through an opening to a conveyor in feeder house 106 toward feed accelerator 108, which accelerates the severed crop material into thresher 110. The severed crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 101 in a windrow.

Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by one or more cleaning fans 120. Cleaning fans 120 direct air along an airflow path upwardly through the sieves and chaffers. The airflow carries residue rearwardly in harvester 101 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Harvester 101 can include a variety of sensors, some of which are illustrated in FIG. 1, such as ground speed sensor 146, one or more mass flow sensors 147, and one or more observation sensor systems 150, and one or more fill level sensors 152.

Ground speed sensor 146 senses the travel speed of harvester 101 over the ground. Ground speed sensor 146 may sense the travel speed of the harvester 101 by sensing the speed of rotation of the ground engaging traction elements 144 or 145, or both, a drive shaft, an axle, or other components. In some instances, the travel speed may be sensed using a positioning system, such as a global positioning system (GPS), a dead reckoning system, a long-range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvester 101 is on a slope, the orientation of harvester 101 relative to the slope is known. For example, an orientation of harvester 101 could include ascending, descending or transversely travelling the slope.

Mass flow sensors 147 sense the mass flow of material (e.g., grain) through clean grain elevator 130. Mass flow sensors 147 may be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor.

Observation sensor systems 150 can include one or more of a variety of sensors, such as cameras (e.g., mono or stereo cameras), Lidar, Radar, Ultrasonic sensors, as well as various other sensor configured to emit and/or receive electromagnetic radiation, as well as a variety of other sensors. Observation sensor systems 150 can illustratively observe (and thus detect characteristics relative to) the worksite 10, items at the worksite 10 (e.g., vegetation, including crops at the worksite), and portions of the harvester 101. While FIG. 1 shows some example positions of observation sensor system 150, it will be understood that observation sensor systems 150 can, alternatively or additionally, be positioned (or otherwise disposed) at a variety of other locations on harvester 101.

Fill level sensors 152 can include one or more of a variety of sensors, such as contact sensors and non-contact sensors. Fill level sensors 152 detect a fill level of grain in grain tank 132. Fill level sensors 152, in the form of contact sensors, include paddles (or other contact members) that are contacted by the grain and the displacement of the contact members or force or load of impact of the material on the contact member can be detected to determine presence of grain material at the level of the tank corresponding to the sensor. Fill level sensors 152, in the form of non-contact sensors, may be configured to capture electromagnetic radiation to detect presence of grain at the level of the tank corresponding to the sensor. In some examples, fill level sensors 152 are configured to alert an operator when the harvester 100 is full (or is approaching full). These are merely some examples. While FIG. 1 shows some example positions of fill level sensors 152, it will be understood that fill level sensors 152 can, additionally or alternatively, be positioned (or otherwise disposed) at a variety of other locations on harvester 100.

Harvester 101 can include various other sensors.

Figure 3:
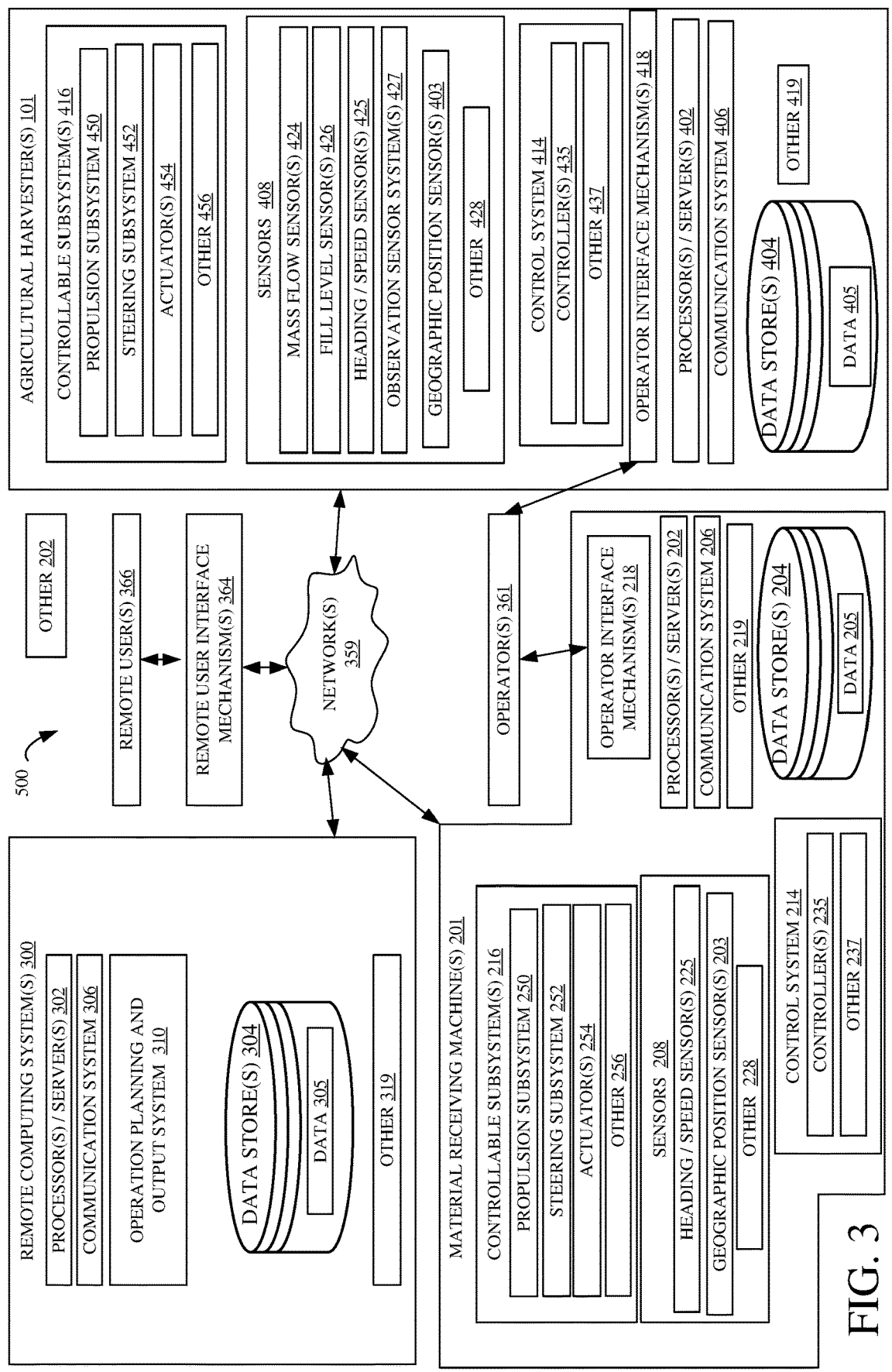
FIG. 3 is a block diagram of one example agricultural worksite operation system architecture.

FIG. 3 is a block diagram showing one example worksite operation system architecture 500 (e.g., agricultural worksite operation system architecture 500). Worksite operation system architecture 500 is also called worksite operation system 500 or simply system 500. Worksite operation system 500 includes one or more mobile primary work machines 100 (illustratively one or more harvesters 101) and one or more mobile support machines 200 (illustratively one or more mobile material receiving machines 201). Worksite operation system 500 also includes one or more remote computing systems 300, one or more networks 359, one or more remote user interface mechanisms 364, and can include a variety of other items 202 as well.

Each agricultural harvester 101, itself, illustratively includes one or more processors or servers 402, one or more data stores 404, communication system 406, one or more sensors 408, control system 414, one or more controllable subsystems 416, one or more operator interface mechanisms 418, and can include various other items and functionality 419 as well. It will be understood, that in other examples of system 500, where the mobile primary work machines 100 are different than harvesters (e.g., planters, production application machines, etc.) various items may be different, for example, but not by limitation sensors 408 and controllable subsystems 416 may be different in different forms of mobile primary work machines. It will also be understood that some items will be the same, or at least, that the different forms of mobile primary work machines will include at least some similar functionality.

Each material receiving machine 201, itself, illustratively includes one or more processors or servers 202, one or more data stores 204, communication system 206, one or more sensors 208, control system 214, one or more controllable subsystems 216, one or more operator interface mechanisms 218, and can include various other items and functionality 219 as well. It will be understood, that in other examples of system 500, where the mobile support machines 200 are different than material receiving machines (e.g., tender vehicles, etc.) various items may be different, for example, but not by limitation sensors 208 and controllable subsystems 216 may be different in different forms of mobile primary work machines. It will also be understood that some items will be the same, or at least, that the different forms of mobile primary work machines will include some similar functionality.

Remote computing systems 300, as illustrated, include one or more processors or servers 302, one or more data stores 304, communication system 306, operation planning and output system 310, and can include various other items and functionality 319.

Data stores 204, data stores 304, or data stores 404, or a combination thereof, store a variety of data (generally indicated as data 205, data 305, and data 405 respectively), some of which will be described in more detail herein. For example, data 205, data 305, or data 405, or a combination thereof, can include, among other things, historical operation data and current operation data, as well as various other data. Some examples of the various data, including historical operation data and current operation data will be described in more detail in FIG. 4. Additionally, data 205 can include computer executable instructions that are executable by one or more processors or servers 202 to implement other items or functionalities of worksite operation system 500 (e.g., other items or functionalities of material receiving machines 201, etc.). Additionally, data 305 can include computer executable instructions that are executable by one or more processors or servers 302 to implement other items or functionalities of worksite operation system 500 (e.g., other items or functionalities of remote computing systems 300, etc.). Additionally, data 405 can include computer executable instructions that are executable by one or more processors or servers 402 to implement other items or functionalities of worksite operation system 500 (e.g., other items or functionalities of agricultural harvesters 100, etc.). It will be understood that data stores 204, data stores 304, or data stores 404, or all three, can include different forms of data stores, for instance both volatile data stores (e.g., Random Access Memory (RAM)) and non-volatile data stores (e.g., Read Only Memory (ROM), hard drives, solid state drives, etc.).

Sensors 408 can include one or more mass flow sensors 424, one or more fill level sensors 426, one or more heading/speed sensors 425, one or more observation sensors systems 427, geographic position sensors 403, and can include various other sensors 428 as well. The sensor data generated by sensors 408 can be communicated to remote computing systems 300, to material receiving machines 200, to other harvesters 101, and to other items of agricultural harvester 100. Control system 414, itself, can include one or more controllers 435 for controlling various other items of agricultural harvester 100, and can include other items 437 as well. Controllable subsystems 416 can include propulsion subsystem 450, steering subsystem 452, actuators 454, and can include various other subsystems 456 as well.

Sensors 208 can include one or more heading/speed sensors 225, one or more geographic position sensors 203, and can include various other sensors 228 as well. The sensor data generated by sensors 208 can be communicated to remote computing systems 300, to agricultural harvesters 100, and to other items of material receiving machines 200. Control system 214, itself, can include one or more controllers 235 for controlling various other items of material receiving machine 200, and can include other items 237 as well. Controllable subsystems 216 can include propulsion subsystem 250, steering subsystem 252, actuators 254, and can include various other subsystems 256 as well.

Mass flow sensors 424 detect a mass flow of material (e.g., grain) into a material receptacle (e.g., grain tank 132) of an agricultural harvester 101. The mass flow sensors 424 can comprise one or more impact sensors, positioned in the clean grain elevator 130, that are impacted by material (grain) as the material is flowing into the grain tank 132. In other examples, the mass flow sensors 424 can be other types of flow sensing devices such as non-contact sensors, for instance, electromagnetic (EM) radiation sensing devices that generate EM radiation that is directed through the material flow and receive the EM radiation that flows through or is reflected from the material flow. In one example, mass flow sensors 424 are similar to mass flow sensors 147. These are merely some examples.

Fill level sensors 426 detect a fill level of material (e.g., grain) in a material receptacle (e.g., grain tank 132) of an agricultural harvester 101. The fill level sensors 426 can comprise contact sensors having a contact member configured to be contacted by the grain in the grain tank 132 and the displacement of the contact member or force or load of impact of the material on the contact member can be detected to determine presence of grain material at the level of the tank corresponding to the sensor. Fill level sensors 426 can comprise non-contact sensors configured to capture electromagnetic radiation to detect presence of grain at the level of the tank corresponding to the sensor. In one example, fill level sensors 426 are similar to fill level sensors 152. These are merely some examples.

Observation sensor systems 427 can include one or more of a variety of sensors, such as cameras (e.g., mono or stereo cameras), Lidar, Radar, Ultrasonic sensors, as well as various other sensor configured to emit and/or receive electromagnetic radiation, as well as a variety of other sensors. Observation sensor systems 427 can illustratively observe (and thus detect characteristics relative to) the worksite 10, items at the worksite 10 (e.g., vegetation, including crops at the worksite), and portions of the harvester 101. In one example, observation sensor systems 427 can detect characteristics of crops at a field, such as crop health, crop downing (or crop lodging), that is, downed crop, as well as various other characteristics of the crop. In one example, observation sensor systems 427 are similar to observation sensor systems 150. These are merely some examples.

Heading/speed sensors 425 detect a heading characteristic (e.g., travel direction) or speed characteristic (e.g., travel speed, acceleration, deceleration, etc.), or both, of an agricultural harvester 101. Heading/speed sensors 225 detect a heading characteristic (e.g., travel direction) or speed characteristic (e.g., travel speed, acceleration, deceleration, etc.), or both, of a receiving machine 201 This can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors. Thus, while heading/speed sensors 425 as described herein are shown as separate from geographic position sensors 403, in some examples, machine heading/speed is derived from signals received from geographic position sensors 403 and subsequent processing. In other examples, heading/speed sensors 425 are separate sensors and do not utilize signals received from other sources. Similarly, while heading/speed sensors 225 as described herein are shown as separate from geographic position sensors 203, in some examples, machine heading/speed is derived from signals received from geographic position sensors 203 and subsequent processing. In other examples, heading/speed sensors 225 are separate sensors and do not utilize signals received from other sources.

Geographic position sensors 403 illustratively sense or detect the geographic position or location of an agricultural harvester 101. Geographic position sensors 203 illustratively sense or detect the geographic position or location of a material receiving machine 200. Geographic position sensors 403 and 203 can include, but are not limited to, a global navigation satellite system (GNSS) receiver that receives signals from a GNSS satellite transmitter. Geographic position sensors 403 and 203 can also include a real-time kinematic (RTK) component that is configured to enhance the precision of position data derived from the GNSS signal. Geographic position sensors 403 and 203 can include a dead reckoning system, a cellular triangulation system, or any of a variety of other geographic position sensors.

Sensors 408 can also include various other types of sensors 428. For example, but not by limitation, sensors 428 can include various sensors that detect characteristics of the harvester 101, such as position (e.g., height, depth, etc.) and orientation (e.g., pitch, roll, and yaw) of various components of harvester 101 relative to other components of harvester 101 or relative to the field surface, motion characteristics (e.g., operating speed, such as operating rotational speed) of various components, power characteristics (e.g., power supplied to various components), fluid pressures, etc. Sensors 208 can also include various other types of sensors 228. For example, but not by limitation, sensors 228 can include various sensors that detect characteristics of the material receiving machine 201, such as position (e.g., height, depth, etc.) and orientation (e.g., pitch, roll, and yaw) of various components of material receiving machine 201 relative to other components of material receiving machine 201 or relative to the field surface, motion characteristics (e.g., operating speed, such as operating rotational speed) of various components, power characteristics (e.g., power supplied to various components), fluid pressures, etc. These are merely some examples.

Control system 414 can include one or more controllers 435 (e.g., electronic control units, which may include or be implemented by one or more processors, such as one or more processors 402) that generate control signals to control one or more components of a harvester 101 or components of system 500, or both. For example, but not by limitation, controllers 435 can include, a communication system controller to control communication system 406, an interface controller to control one or more interface mechanisms (e.g., 418 or 364, or both), a propulsion controller to control propulsion subsystem 450 to control a travel speed of an agricultural harvester 101, a path planning controller to control steering subsystem 452 to control a route or heading of an agricultural harvester 101, and one or more actuator controllers to control operation of actuators 454. In other examples, a central controller 435 can be used to generate control signals to control a plurality of the controllable subsystems 416 as well, in some examples, other items of system 500. Control system 214 can include a variety of controllers 235 (e.g., electronic control units, which may include or be implemented by one or more processors, such as one or more processors 202) that generate control signals to control one or more components of a material receiving machine 201 or components of system 500, or both. For example, but not by limitation, controllers 235 can include a communication system controller to control communication system 206, an interface controller to control one or more interface mechanisms (e.g., 218 or 364, or both), a propulsion controller to control propulsion subsystem 250 to control a travel speed of a material receiving machine 201, and a path planning controller to control steering subsystem 252 to control a route or heading of a material receiving machine 201. In other examples, a central controller 235 can be used to generate control signals to control a plurality of the controllable subsystems 216 as well, in some examples, other items of system 500.

Propulsion subsystem 450 includes one or more controllable actuators (e.g., internal combustion engine, motors, pumps, gear boxes, etc.) that drive the ground engaging traction elements (e.g., wheels or tracks) of an agricultural harvester 101. Propulsion subsystem 250 includes one or more controllable actuators (e.g., internal combustion engine, motors, pumps, gear boxes, etc.) that drive the ground engaging traction elements (e.g., wheels or tracks) of a material receiving machine 201.

Steering subsystem 452 includes one or more controllable actuators (e.g., electric actuators, hydraulic actuators, etc.) that are controllably actuatable to control the steering and thus heading of an agricultural harvester 101. Steering subsystem 252 includes one or more actuators (e.g., electric actuators, hydraulic actuators, etc.) that are controllably actuatable to control the steering and thus heading of a material receiving machine 201.

Actuators 454 include a variety of different types of actuators that control operation of one or more components of an agricultural harvester 101. Actuators 454 may include actuators that control the position or orientation of components of an agricultural harvester 101 as well as actuators that control a speed of components of an agricultural harvester 101. Actuators 454 can include, without limitation, motors, valves, pumps, hydraulic actuators (e.g., hydraulic cylinders, etc.), pneumatic actuators (e.g., pneumatic cylinders, etc.), electric actuators (e.g., linear actuators, etc.), as well as various other types of actuators. Actuators 254 include a variety of different types of actuators that control operation of one or more components of a material receiving machine 201. Actuators 254 may include actuators that control the position or orientation of components of a material receiving machine 201 as well as actuators that control a speed of components of a material receiving machine 201. Actuators 254 can include, without limitation, motors, valves, pumps, hydraulic actuators (e.g., hydraulic cylinders, etc.), pneumatic actuators (e.g., pneumatic cylinders, etc.), electric actuators (e.g., linear actuators, etc.), as well as various other types of actuators.

Communication system 406 is used to communicate between components of an agricultural harvester 101 or with other items of worksite operation system 500, such as remote computing systems 300, material receiving machines 201, or other agricultural harvesters 101, or a combination thereof. Communication system 206 is used to communicate between components of a material receiving machine 201 or with other items of worksite operation system 500, such as remote computing systems 300, agricultural harvesters 101, or other material receiving machines 201, or a combination thereof. Communication system 306 is used to communicate between components of a remote computing system 300 or with other items of worksite operation system 500, such as agricultural harvesters 101, material receiving machines 201, or other remote computing systems 300, or a combination thereof.

Communication systems 206, 306, and 406 can each include one or more of wired communication circuitry and wireless communication circuitry, as well as wired and wireless communication components. In some examples, communication systems 206, 306, and 406 can each be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication systems 206, 306, and 406 can each also include a system that facilitates downloads or transfers of information to and from a secure digital (SD) card or a universal serial bus (USB) card, or both. Communication systems 206, 306, and 406 can each utilize network 359. Networks 359 can be any of a wide variety of different types of networks such as the Internet, a cellular network, a wide area network (WAN), a local area network (LAN), a controller area network (CAN), a near-field communication network, or any of a wide variety of other networks or communication systems.

FIG. 3 also shows that remote computing systems 300 include operation planning and output system 310. Operation planning output system 310 obtains various data, including historical operation data and current operation data, and generates one or more operation plan outputs that can be used in the control of one or more mobile primary work machines 100 (e.g., one or more harvesters 101, etc.) and one or more mobile support machines 200 (e.g., one or more material receiving machines 200), as well as in the control of one or more other items, such as remote user interface mechanisms 364 to generate presentations (e.g., displays, etc.) based on (or indicative of) the one or more operation plan outputs. Additionally, it will be understood that control of the one or more mobile primary work machines 100 and control of the one or more mobile support machines 200 can include controlling one or more interface mechanisms (e.g., 405 and 205, respectively) to generate presentations (e.g., displays, etc.) based on (or indicative of) the one or more operation plan outputs. The operation plan outputs can include one or more routes, one or more unloading locations, as well as one or more other items. Operation planning and output system 310 will be described in greater detail below.

FIG. 3 also shows remote users 366 interacting with agricultural harvesters 101, material receiving machines 201, and remote computing systems 300 through user interface mechanisms 364 over networks 359. In some examples, user interface mechanisms 364 may include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the users 366 may interact with user interface mechanisms 364 using touch gestures. Additionally, at least some of the user interface mechanisms 364 can be used to present (e.g., display, audible presentation, haptic presentation, etc.) various information, including information based on (or indicative of) the one or more operation plan outputs. These examples described above are provided as illustrative examples and are not intended to limit the scope of the present disclosure. Consequently, other types of user interface mechanisms 364 may be used and are within the scope of the present disclosure.

FIG. 3 also shows that one or more operators 361 may operate agricultural harvesters 100 and material receiving machines 200. The operators 361 interact with operator interface mechanisms 418 or operator interface mechanisms 218. In some examples, operator interface mechanisms 418 and operator interface mechanisms 218 may each include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the operators 361 may interact with operator interface mechanisms 418 and operator interface mechanisms 218 using touch gestures. Additionally, at least some of the operator interface mechanisms 418 and operator interface mechanisms 218 can be used to present (e.g., display, audible presentation, haptic presentation, etc.) various information, including information based on (or indicative of) the one or more operation plan outputs. These examples described above are provided as illustrative examples and are not intended to limit the scope of the present disclosure. Consequently, other types of operator interface mechanisms 418 and operator interface mechanisms 218 may be used and are within the scope of the present disclosure.

Remote computing systems 300 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems. In one example, agricultural harvesters 101 can be controlled remotely by remote computing systems 200 or by remote users 366, or both. In one example, material receiving machines 201 can be controlled remotely by remote computing systems 300 or by remote users 366, or both. In some examples, operators 361 are on-board (e.g., in an operator compartment, such as a cab) the machines (e.g., 100 or 200). In some examples, operators 361 are remote from the machines (e.g., 100 or 200) and control the machines through one or more interface mechanisms (e.g. one or more of 405 and one or more of 205) which are remote from the machines but operatively coupled (e.g., communicatively coupled, such as over networks 359) to the machines.

In some examples, one or more of the components shown in FIG. 3 as being disposed on remote computing systems 300 can additionally, or alternatively, be located elsewhere, such as at agricultural harvesters 101 or material receiving machines 201, or both. Thus, it will be understood that the items in worksite operation system 500 can be distributed in various ways, including ways that differ from the example shown in FIG. 3.

Figure 4:
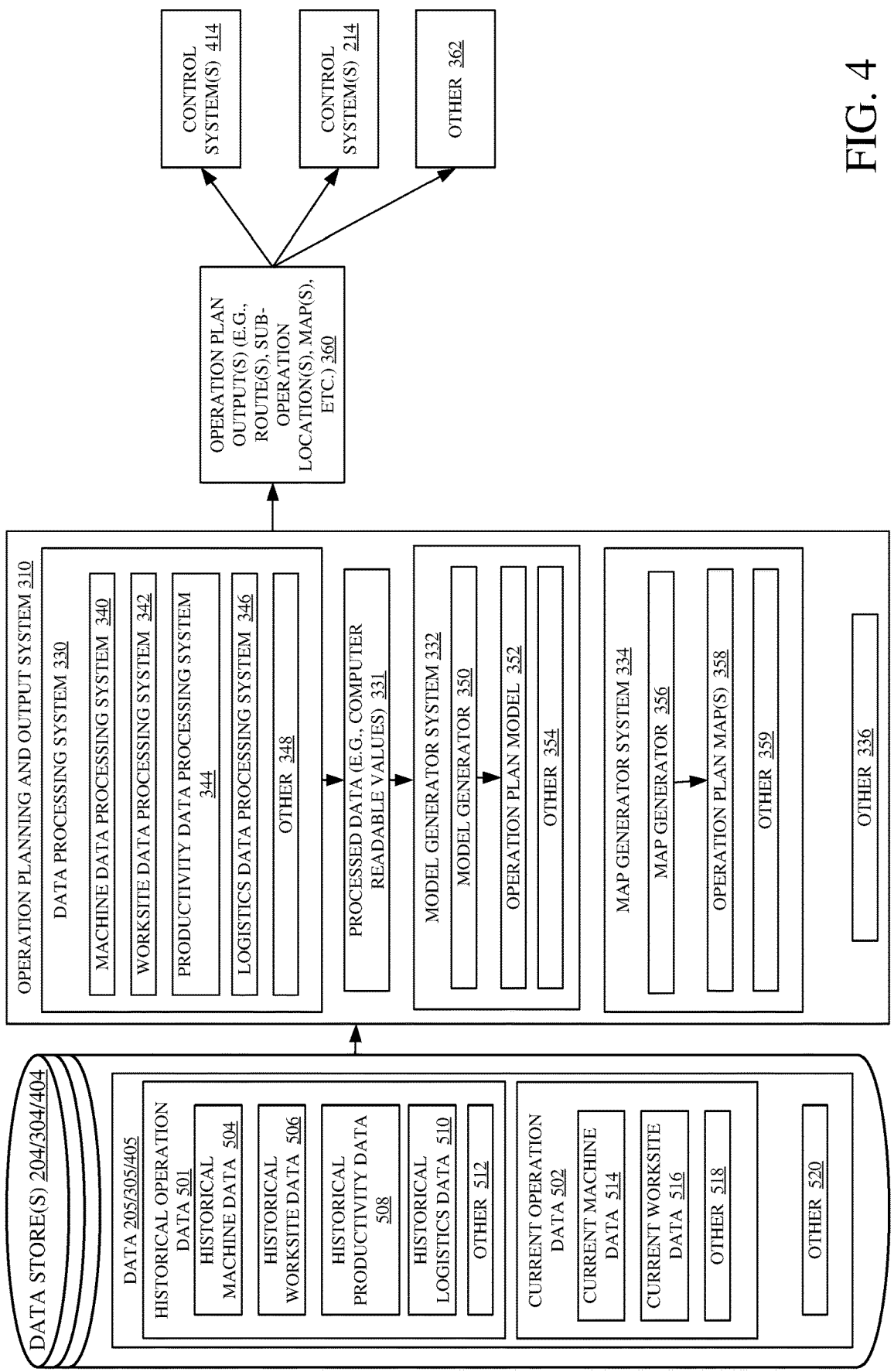
FIG. 4 is a block diagram showing some examples of components of the agricultural worksite operation system architecture, including operation planning and output system, in more detail.

FIG. 4 is a block diagram that shows examples of some of the components of agricultural worksite operation system architecture 500 in more detail and information flow between the components.

As illustrated in FIG. 4, it can be seen that data stores 204, data stores 304, data stores 404, or a combination thereof, can include as data (205, 305, and 405, respectively), historical operation data 501, current operation data 502, and include various other data 520, including, but not limited to, other data described elsewhere herein. Historical operation data 501, as illustrated, includes historical machine data 504, historical worksite data 506, historical productivity data 508, historical logistics data 510, and can include various other data 512. Current operation data 502, as illustrated, includes current machine data 514, current worksite data 516, and can include various other data 518.

It will be understood that current operation data 502 does not necessarily mean data of an operation currently underway. Rather, current operation data 502 can be data relative to a current operation underway or data relative to an upcoming operation, such as an upcoming operation in a current year or current season. In other words, current operation data 502 is data relative to an operation that has not yet been completed, and, in some examples, is not yet underway. In some examples, where the data is located may depend on where operation planning and output system 310 (also called system 310) is located.

Generally, historical operation data 501 is data corresponding to one or more historical operations. The historical operation data 501 can be generated during or prior to the historical operation to which it corresponds. Historical operation data 501 can be relative to the same worksite as the worksite of the current operation or can be from one of a plurality of different worksites. In some examples, where the historical operation data 501 is relative to different worksites, it may be relative to different worksites that are, in one or more ways, similar to the worksite of the current operation, for instance, in a similar geographic area, used to grow similar crops, or in various other ways. Generally, current operation data 502 is data corresponding to the current operation. Current operation data 501 can be generated during or prior to the current operation to which it corresponds. However, current operation data 501 is generated after the most recent historical similar operation. For example, if the current operation is a harvesting operation, then current operation data 501 can be generated during or before the current harvesting operation, but after the most recent historical harvesting operation at the worksite. As an example, current worksite data 516, such as current vegetation characteristics data, can be, in one example, a map or satellite image (e.g., NDVI image) of the worksite generated during the growing season prior to the current harvesting operation but after the crops were planted and thus, after the most recent historical harvesting operation at the worksite. As another example, current worksite data 516, such as current vegetation characteristics data, can be, in one example, sensor data generated by as sensor on a machine while the current operation is underway.

As shown in FIG. 4, operation planning and output system 310 includes data processing system 330, model generator system 332, map generator system 334, and can include various other items and functionalities 336 as well. Data processing system 330, itself, includes machine data processing system 340, worksite data processing system 342, productivity data processing system 344, logistics data processing system 346, and can include various other items 348 as well. Data processing system 330 generates processed data 331. Model generator system 332, itself, includes model generator 350 that generates operation plan model 352. Model generator system 332 can include various other items 354 as well. Map generator system 334, itself, includes map generator 356 that generates one or more operation plan maps 358. Map generator system 334 can include various other items 359 as well. As will be described in more detail, system 310 is operable to generate one or more operation plan outputs 360.

As briefly discussed above, historical operation data 502 is data relative to historical operations, for example, historical agricultural operations, such as historical harvesting operations, though, in other examples, could be other types of agricultural operations.

It will be understood that each historical operation will have an associated (corresponding) set of historical machine data 504, historical worksite data 506, historical performance data 508, historical logistics data 510, and other data 512. Thus, in some examples, each historical operation, can include, as features, one or more items of information from each of data 504, 506, 508, 510, and 512. Additionally, each machine associated with a particular historical operation may have corresponding features, such as one or more corresponding items of information from each data 504, 508, 510, and 512. Each historical operation can be associated with a particular identification character (e.g., ID number or code, etc.).

Historical machine data 504 includes data relative to the one or more machines that operated in each historical operation. Data 504 can include the number of machines or, more particularly, the number of each type of machine that operated in a given historical operation. For instance, for a harvesting operation, the number of harvesters and the number of material receiving machines (e.g., the number of mobile grain carts and the number of mobile grain trucks). Data 504 can include machine type data (e.g., model, configuration, etc.) for each machine that operated in a given historical operation. For instance, for a harvesting operation, the machine type data (e.g., model, configuration, etc.) for each harvester and each material receiving machine. Data 504 can include machine ratings data (e.g., machine performance capabilities, etc.) for each machine that operated in a given historical operation. For instance, for a harvesting operation, the machine ratings data can include machine performance capabilities such as grain tank/material receptacle capacities, material unloading rates, as well as other machine performance capabilities for each harvester and each material receiving machine. Historical machine data 504 can include other machine information.

Historical worksite data 506 includes data relative to a worksite (e.g., field(s), etc.) corresponding to each historical operation. Data 506 can include the worksite dimensions data (e.g., length and width, size (e.g., acreage, etc.)) of each worksite of each historical operation. Data 506 can include worksite terrain characteristics data (e.g. topographic characteristics, such as elevation and slope, soil characteristics, such as soil type, soil moisture, soil compaction, etc., as well as various other terrain characteristics) of each worksite of each historical operation. Data 506 can include worksite features data (e.g., presence and location of headlands, location of worksite entrance(s)/exit(s), presence and location of obstacles, etc.) of each worksite of each historical operation. Data 506 can include worksite vegetation characteristics data (e.g., crop type, crop health, downed crop, weed characteristics, etc.). Historical worksite data 506 can include other worksite information.

Historical productivity data 508 includes data relative to performance of each historical operation. Data 508 can include machine performance metrics for each machine. For instance, for a harvesting operation, machine performance metrics can include yield (e.g., bushels per hour, etc.) for each harvester, time to complete (e.g., how long the operation took to complete), completion rate (e.g., acres per hour, etc.), transport totals (e.g., bushels out of (carried off and away from) the field(s) per hour, etc.), machine downtime, fuel efficiency, as well as other performance metrics. Historical productivity data 508 can include various other productivity information.

Historical logistics data 510 includes data relative to the routing and positioning of the machines of each historical operation. For instance, for a harvesting operation, historical logistics data 510 can include route(s) travelled by each machine. For example, route information for each harvester can include the location of the initial (or breakthrough) harvesting path and the turn pattern of the harvesting route (which can include the location of the harvesting route, the type of turn pattern (e.g., spiral-in turn pattern, spiral-out turn pattern, zig-zag turn pattern, concentric turn pattern, etc.) as well as the size of the turn pattern (e.g., number of passes/turns). Route information for each material receiving machine can include route information describing the location of the initial path of a receiving machine (e.g., initial path of a mobile grain cart traveling to receive a first load of material from a harvester in an operation), the location of the route, and the route of the material receiving machine between other machines, on and off the field, etc. Additionally, historical logistics data 510 can include machine location information (e.g., tracked machine GPS data) for each machine. For instance, for a harvesting operation, machine location information for each harvester and each material receiving machine. Further, historical logistics data 510 can include sub-operation location information. For instance, for a harvesting operation, sub-operation location information can include the locations at which unloading occurred, such as locations where unloading from a harvester to a mobile grain cart occurred and locations where unloading from a mobile grain cart to a mobile grain trailer occurred. Thus, sub-operation location information (and, in some examples, in combination with other data, such as machine location information), for a harvesting operation, can indicate where mobile grain trailer(s) were parked during the operation to receive material. Historical logistics data 510 can include various other logistics information.

It will be understood that there can be a variety of sources for the historical operation data. For example, sources can include machine sensors, control system outputs (e.g., control signals or other commands), worksite maps, aerial (e.g., satellite, etc.) images of the worksite, operator or user inputs, manufacturer-provided data, as well as various other sources.

Current machine data 514 includes data relative to the one or more machines that are operating in an underway operation or are planned to operate in an upcoming operation. Data can include the number of machines or, more particularly, the number of each type of machine that are operating in an underway operation or are planned to operate in an upcoming operation. For instance, for an underway or upcoming harvesting operation, the number of harvesters and the number of material receiving machines (e.g., the number of mobile grain carts and the number of mobile grain trucks). Data 514 can include machine type data (e.g., model, configuration, etc.) for each machine that operating in an underway operation or is planned to operate in an upcoming operation. For instance, for a harvesting operation, the machine type data (e.g., model, configuration, etc.) for each harvester and each material receiving machine. Data 514 can include machine ratings data (e.g., machine performance capabilities, etc.) for each machine that is operating in an underway operation or for each machine that is planned to operate in an upcoming operation. For instance, for a harvesting operation, the machine ratings data can include machine performance capabilities such as grain tank/material receptacle capacities, material unloading rates, as well as other machine performance capabilities for each harvester and each material receiving machine. Current machine data 514 can include other machine information.

Current worksite data 516 includes data relative to a worksite (e.g., field(s), etc.) corresponding to an underway or an upcoming operation. Data 516 can include the worksite dimensions (e.g., length and width) of the worksite of the underway or upcoming operation. Data 516 can include worksite size (e.g., acreage, etc.) of the worksite of the underway or upcoming operation. Data 516 can include worksite terrain (e.g. topographic characteristics, such as elevation and slope, soil characteristics, such as soil type, soil moisture, soil compaction, etc., as well as various other terrain characteristics) of the worksite of the underway or upcoming operation. Data 516 can include worksite features (e.g., presence and location of headlands, presence and location of obstacles, etc.) of the worksite of the underway or upcoming operation. Data 506 can include worksite vegetation characteristics (e.g., crop type, crop health, downed crop, weed characteristics, etc.) of the worksite of the underway or upcoming operation. Current worksite data 516 can include other worksite information.

It will be understood that there can be a variety of sources for the historical operation data. For example, sources can include worksite maps, prescriptions, aerial (e.g., satellite, etc.) images of the worksite, operator or user inputs, manufacturer-provided data, as well as various other sources.

Data processing system 330 processes historical operation data 501, current operation data 502, and other data 520 to generate (or derive) computer readable values, readable by model generator system 332 (e.g., model generator 350 and operation plan model 352). Data processing system 330 can include image processing functionality, sensor signal processing functionality, filtering functionality, categorization functionality, normalization functionality, aggregation functionality, as well as various other data processing functionalities.

Machine data processing system 340 process historical machine data 504 and current machine data 514 to generate (or derive) computer readable values representative of (or corresponding to) the information provided in historical machine data 504 and current machine data 514.

Worksite data processing system 342 processes historical worksite data 506 and current worksite data 516 to generate or derive computer readable values representative of (or corresponding to) the information provided in historical worksite data 506 and current worksite data 516.

Productivity data processing system 344 processes historical productivity data 508 to generate or derive computer readable values representative of (or corresponding to) the information provided in historical productive data 508.

Logistics data processing system 346 processes historical logistics data 510 to generate or derive computer readable values representative of (or corresponding to) the information provided in historical logistics data 510.

Thus, it can be seen that data processing system 330 is operable to process historical operation data 501, current operation data 502, and other data 520 to generate processed data 331. The processed data 331 includes values (computer readable values), such as historical machine data values, historical worksite data values, historical productivity values, historical logistics data values, current machine data values, current worksite data values, and other data values. Processed data 331 is obtained (e.g., retrieved or received) by model generator system 350.

Model generator system 332 is operable to output routes and unloading locations for an underway or upcoming operation, such as an underway or upcoming harvesting operation based on input processed data 331.

Model generator 350 is operable to generate an operation plan model 352 based on historical operation data 501, or, more specifically, based on processed historical operation data of processed data 331. Thus, the historical operation data 501 (or the processed historical operation data of processed data 331) constitutes training data. Model generator 350 includes, or is configured to execute, one or more machine learning, or artificial intelligence (AI), algorithms such as neural networks, generative AI, as well as various other machine learning, or artificial intelligence, algorithms. As will be understood, in some examples, the historical logistics data 510 (or the processed historical logistics data of processed data 331) may be used to correct until convergence. That is, the model generator 350 will iteratively repeat the generation of a model, utilizing one or more machine learning, or AI, algorithms, and adjusting of model parameters (e.g., weight, biases, etc.) until the output logistics data of the model is sufficiently or otherwise desirably converged with the data used for correction, that is until the difference (or error) between model output logistics data and the data used for correction (e.g., the historical logistics data 510, or the processed historical logistics data of processed data 331) is sufficiently or otherwise desirably minimal. Convergence results in the generation of operation plan model 352 (i.e., operation plan model is a converged model). It will be understood that sufficiently or otherwise desirably, as applied to convergence, can mean, in one example, error is no longer decreasing with each iteration or can mean the error has reached a desired or sufficient minimum level (which may be provided by a user or operator or may be provided in other ways).

Operation plan model 352 obtains (e.g., retrieves or receives), as model inputs, current operation data 502 (e.g., current machine data 514 and current worksite data 516) or processed current operation data (e.g., processed current machine data and processed current worksite data) of processed data 331 and provides, as model outputs, routes for each machine in the underway or upcoming operation and sub-operation location(s) for the underway or upcoming operation. For instance, in a harvesting operation, the routes can include harvesting routes (e.g., location of the harvesting route, including the location of the initial, or break through harvesting path, and turn pattern) for each harvester, the routes of each material receiving machine, for instance the route of each mobile grain cart (e.g., location of the route, including the location of the initial path, the location of paths between the machines or to and from unloading locations, and the location of paths on and off the worksite) and the route of each mobile grain trailer (e.g., location of the route, including the location of the paths on and off the field, and the location of the paths to and from the unloading locations). Additionally, in a harvesting operation, the sub-operation locations can include the unloading locations (e.g. the locations at which the mobile grain trailers will be parked and at which mobile grain carts will unload material into the mobile grain trailers, the locations at which the mobile grain carts will park or travel (in-tandem with a harvester) and receive material from a harvester).

Thus, it can be seen the operation plan model 352 is operable to output predictive operation plans (routes and sub-operation locations) for an underway or upcoming operation.

It will be understood that operation plan model 352 can generate such model outputs prior to an upcoming operation or during an underway operation, or both. For example, an initial operation plan output 360 corresponding to an upcoming operation may be output by system 310 based on current operation data 502 (or processed current operation data of processed data 331) relative to the upcoming operation. During execution, the operation may vary from the initial plan, for one or more of a variety of reasons. In such a case, system 310 can dynamically output an updated or subsequent operation plan output 360 corresponding to the underway operation based on current operation data 502 (or processed current operation data of processed data 331) relative to the underway operation. It will be understood that, at least some of the current operation data 502 (or processed current operation data of processed data 331) relative to the underway operation is generated during execution of the underway operation, such as by sensors of the machines, by operators or users, or in other ways.

Additionally, it will be understood that model generator 350 can utilize subsequent data to continue to train and generate operation plan model 352, for instance, once an upcoming or underway operation is completed and thus becomes a historical operation, the data corresponding to that operation can be used for further training.

Map generator system 334 is operable to produce one or more operation plan map(s) 358 based on outputs (e.g., routes and sub-operation locations) of the model generator system 332 and based on current operation data 502 (e.g., current worksite data 516, which can include prior maps of the worksite or other georeferenced information, or both). An operation plan map 358 is a map of a worksite that can include indicators indicative of one or more of the routes and sub-operation locations (output by model generator system 332) at their locations in the worksite. In one example, map generator 334 can utilize a prior map of the worksite and overlay (or otherwise incorporate) the indicators. In some examples, map generator 356 may generate different operation plan maps 358 for the different types of machines in the underway or upcoming operation. For instance, in some examples, it may be preferable that a map presented to an operator of material receiving machine not include all the same information as a map presented to an operator of a harvester, and vice-versa. Operation plan maps 358 can be output, as part of operation plan outputs 360.

Thus, it can be seen that system 310 is operable to produce one or more operation plan outputs 360. An operation plan output 360 can include one or more routes, one or more sub-operation locations, one or more operation plan maps 358, and one or more other items as well. An operation plan output 360 can be used in the control of one or more mobile work machines (e.g., one or more mobile primary work machines and one or more mobile support machines). For example, an operation plan output 360 can be obtained (e.g., retrieved or received) by one or more control systems 414 to control one or more harvesters 101 (e.g., one or more controllable subsystems 416, etc.) and by one or more control systems 214 to control one or more material receiving machines 201 (e.g., one or more controllable subsystems 216, etc.). Additionally, or alternatively, an operation plan output 360 can be presented to one or more operators or one or more users, or both. For example, an operation plan output 360 can be obtained (e.g., retrieved or received) by one or more control systems 414 to control one or more interface mechanisms 418 to present (e.g., display, etc.) information of (or based on) the operation plan output 360 to one or more operators 361 of one or more harvesters 101 and by one or more control systems 214 to control one or more interface mechanisms 218 to present (e.g., display, etc.) information of (or based on) the operation plan output 360 to one or more operators 361 of one or more material receiving machines 201. Additionally, or alternatively, an operation plan output 360 can be obtained (e.g., retrieved or received) by various other items and used in various other ways. For example, but not by limitation, an operation plan output 360 can be obtained (e.g., retrieved or received) by one or more other items 367, such as one or more interface mechanisms 364 which can present (e.g., display, etc.) information of (or based on) the operation plan output 360 to one or more users 366.

Figure 5:
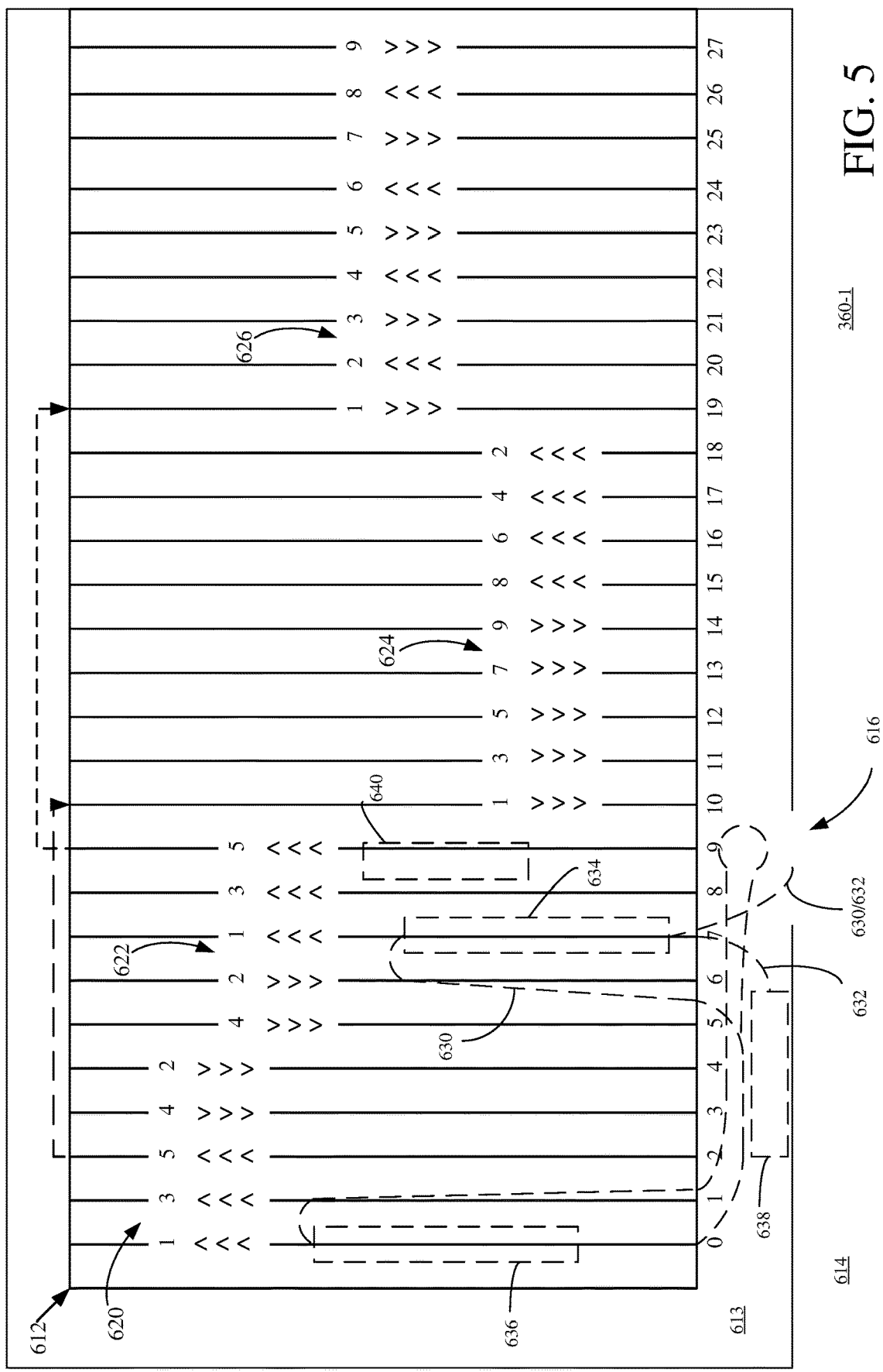
FIG. 5 is a pictorial illustration showing one example operation plan output.

FIG. 5 is a pictorial illustration showing one example of a operation plan output 360 (illustratively 360-1). As shown in FIG. 5, operation plan output 360-1 is in the form of a display (displayable on one or more interface mechanisms 218, 418, or 364, or a combination thereof), specifically a display of an operation plan map 358. As illustrated, operation plan output 360-1 displays a worksite, the worksite includes field portion 612 (corresponding to a field of the worksite), headland portion 613 (corresponding to headlands of the field), road portion (corresponding to a road adjacent to the field), and a field entrance/exit portion 616 (corresponding to an entrance to and exit from the field from the road. As illustrated, operation plan output 360-1 further includes a first harvest route indicator 620 (representing a first harvest route) and a second harvest route indicator 624 (representing a second harvest route) corresponding to a first harvester 101 and a first harvest route indicator 622 (representing a first harvest route) and a second harvest route indicator 626 (representing a second harvest route) corresponding to a second harvester 101. As further illustrated, output 360-1 includes a mobile grain cart route indicator 630 (representing a route for a mobile grain cart) corresponding to a mobile grain cart (e.g., 201-1 or 201-2) and a mobile grain trailer route indicator 632 (representing a route for a mobile grain trailer) corresponding to a mobile grain trailer (e.g., 201-3 or 201-4). Further, as illustrated, output 360-1 includes a plurality of sub-operation location indicators including a first unloading location indicator 634 (representing a location at or along which material will be transferred from the second harvester 101 to the mobile grain cart), a second unloading location indicator 636 (representing a location at or along which material will be transferred from the first harvester 101 to the mobile grain cart), a third unloading location indicator 638 (representing a location at or along which material will be transferred from the mobile grain cart to a mobile grain trailer), and a third unloading location indicator 640 (representing a location at or along which the material will be transferred from the mobile grain cart to a mobile grain trailer).

As can be seen, the field consists of 28 harvest paths (or passes) (at least based on the harvesters being used in the operation). As can be seen, the harvest routes for each harvester 101 can differ from one another. For example, the harvest route represented by indicator 620 is a spiral-in turn pattern that includes an initial harvest path represented by "1" and then subsequently continues to "2", "3", "4", and then "5" after which the harvester 101 will travel, in the headlands, to the next harvest route represented by indicator 624. Conversely, the harvest route represented by indicator 622 is a spiral-out turn pattern that includes an initial harvest path represented by "1" and then subsequently continues to "2", "3", "4", and then "5" after which the harvester 101 will travel, in the headlands, to the next harvest route represented by indicator 626.

Additionally, as can be seen, the harvest routes for each harvester 101 can be similar to one another. For example, the harvest routes represented by indicator 620 and 622 consist of a same number of passes (five). Similarly, the harvest routes represented by indicators 624 and 626 consist of a same number of passes (nine). The harvest routes for each harvester can be different from one another. For example, the harvest route represented by indicator 620 is a spiral-in pattern and the harvest route represented by indicator 622 is a spiral-out pattern. Similarly, the harvest route represented by indicator 624 is a spiral-in pattern that includes a first path of the route, represented by "1", and then subsequently continue to "2", "3", "4", "5", "6", "7", "8", and then "9" and the harvest route represented by indicator 626 is a zig-zag pattern that includes a first path of the route, represented by "1", and then subsequently continues to "2", "3", "4", "5", "6", "7", "8", and then "9 after which the field will be completely harvested. Similarly, the harvest routes can differ in the number of passes, for example, the two harvest routes corresponding to the first harvester 101 (represented by indicators 620 and 624) each consist of a different number of passes. Similarly, the two harvest routes corresponding to the second harvester 101 (represented by indicators 622 and 626) each consist of a different number of passes. Additionally, the harvest routes can have a similar number of passes. For example, the first harvest route for each harvester 101 (represented by indicators 620 and 622) consist of a same number of passes and the second harvest route for each harvester 101 (represented by indicators 624 and 626) consist of a same number of passes. These are merely examples. In other examples, the harvest routes can all be different (e.g., different number of passes and different turn pattern, or both), all be the same (e.g., same number of passes and same turn pattern), or can be some combination of different and the same (e.g., different in one or more ways and the same in one or more ways, such as different number of passes but same turn pattern or same number of passes but different turn pattern).

Figure 6:
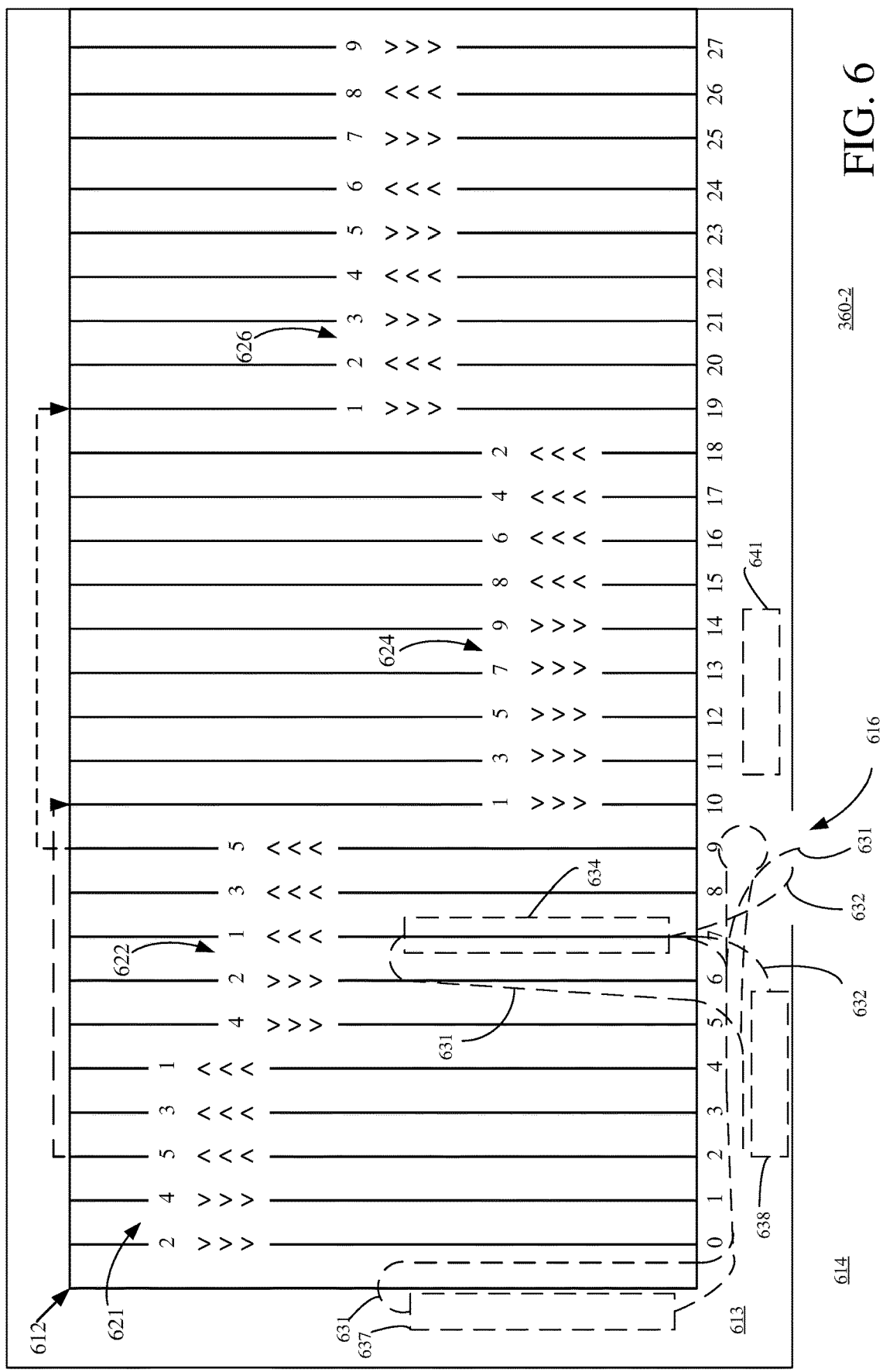
FIG. 6 is a pictorial illustration showing one example operation plan output.

It can be seen, in the example shown in FIGS. 5-6, that each pass of a harvest route indicator includes, in addition to a number (indicating the order of the pass), arrows indicating the travel direction.

The mobile grain cart route indicator 630 represents a route the mobile grain cart will take to enter the field, travel to the first unloading location (represented by indicator 634) to receive material from the second harvester 101, then travel to the third unloading location (represented by indicator 638) to unload the material into the mobile grain trailer, then travel to the second unloading location (represented by indicator 636) to receive material from the first harvester 101, then travel back to the third unloading location to unload the material into the mobile grain trailer. As can be seen in FIG. 5, the mobile grain cart route travels over areas of the field that will have been harvested. It can also be seen that unloading corresponding to the first unloading location will occur while the second harvester 101 is traveling along the third path. Additionally, it can also be seen that the unloading corresponding to the second unloading location will occur while the first harvester 101 is traveling along the third path. The starting times of the harvesters 101 may be staggered to accommodate this.

The mobile grain trailer route indicator 632 represents a route the mobile grain trailer will take to enter the field and travel to the third unloading location (represented by 638). As can be seen, given the field characteristics and the timing of the operation, the mobile grain trailer will pull into the field and then back up into position at the third unloading location. It can be seen that the mobile grain trailer route travels over areas of the field that will have been harvested. It can further be seen that a further unloading location (represented by 640) has been provided and represents a location at which a mobile grain trailer will receive material from a mobile grain cart when the harvesters are executing their second harvest routes.

FIG. 6 is a pictorial illustration showing one example of an operation plan output 360 (illustratively 360-2). Operation plan output 360-2 is similar to operation plan output 360-1 and thus, similar items are numbered similarly. In the examples of FIGS. 5-6, operation plan output 360-1 comprises an initial operation plan output for an upcoming operation, whereas operation plan output 360-2 comprises a subsequent (or updated) operation plan output for that operation once underway. During the course of the operation, changes have been made to the initial plan.

As can be seen, the first harvest route corresponding to the first harvester 101 (previously represented by indicator 620 and now represented by indicator 621) has a different initial first path (though is still a spiral-in turn pattern with 5 paths). For example, the operator of the first harvester 101 may have simply decided to start with a different initial path, or the change could have been made for another reason. This updated data (current operation data 502) is provided to operation plan model 352 which outputs, to accommodate the change to the initial path, an updated mobile grain cart route represented by indicator 631 and a new second unloading location represented by indicator 637. The mobile grain cart will now first travel to the second unloading location, then to the third unloading location, and then to the first unloading location. It can be seen that unloading at the second unloading location will take place while the first harvester is traveling along the second path. Additionally, later in the operation, while the second harvester 101 is on the third path, on-board sensors of the second harvester 101 detect that the soil is wet (e.g., heading/speed sensors 425 detect wheel slip or observation sensor systems 427 detect wet soil) at the initially planned fourth unloading location (represented by 640). This updated data (current operation data 502) is provided to the operation plan model 352 which outputs, to account for the soil moisture, an updated fourth unloading location 641.

Figure 7A:
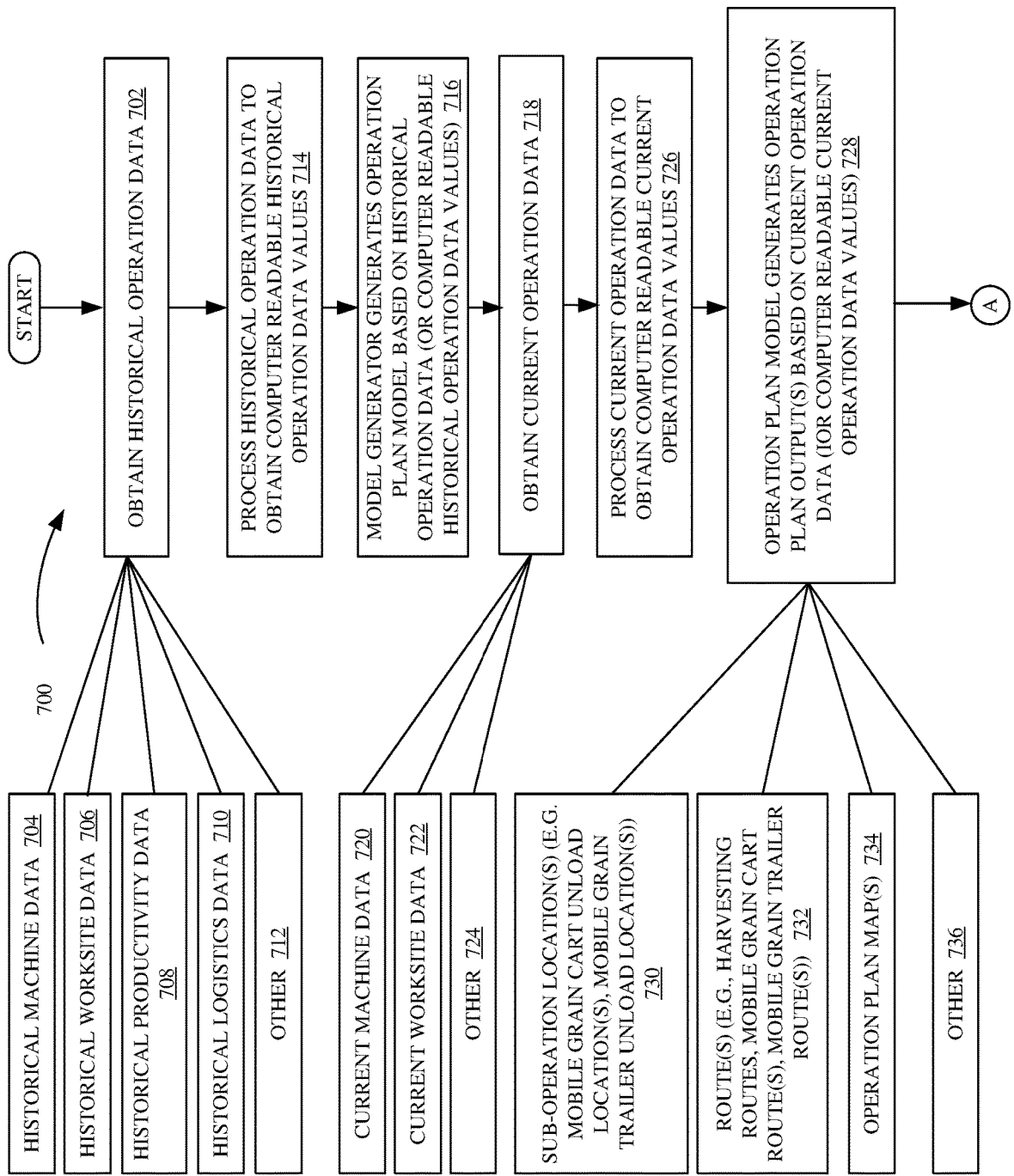
FIGS. 7A-7B (collectively referred to herein as FIG. 7) show a flow diagram illustrating one example operation of an agricultural worksite operation system architecture in generating an operation plan output(s) and control of one or more mobile agricultural work machines.
Figure 7B:
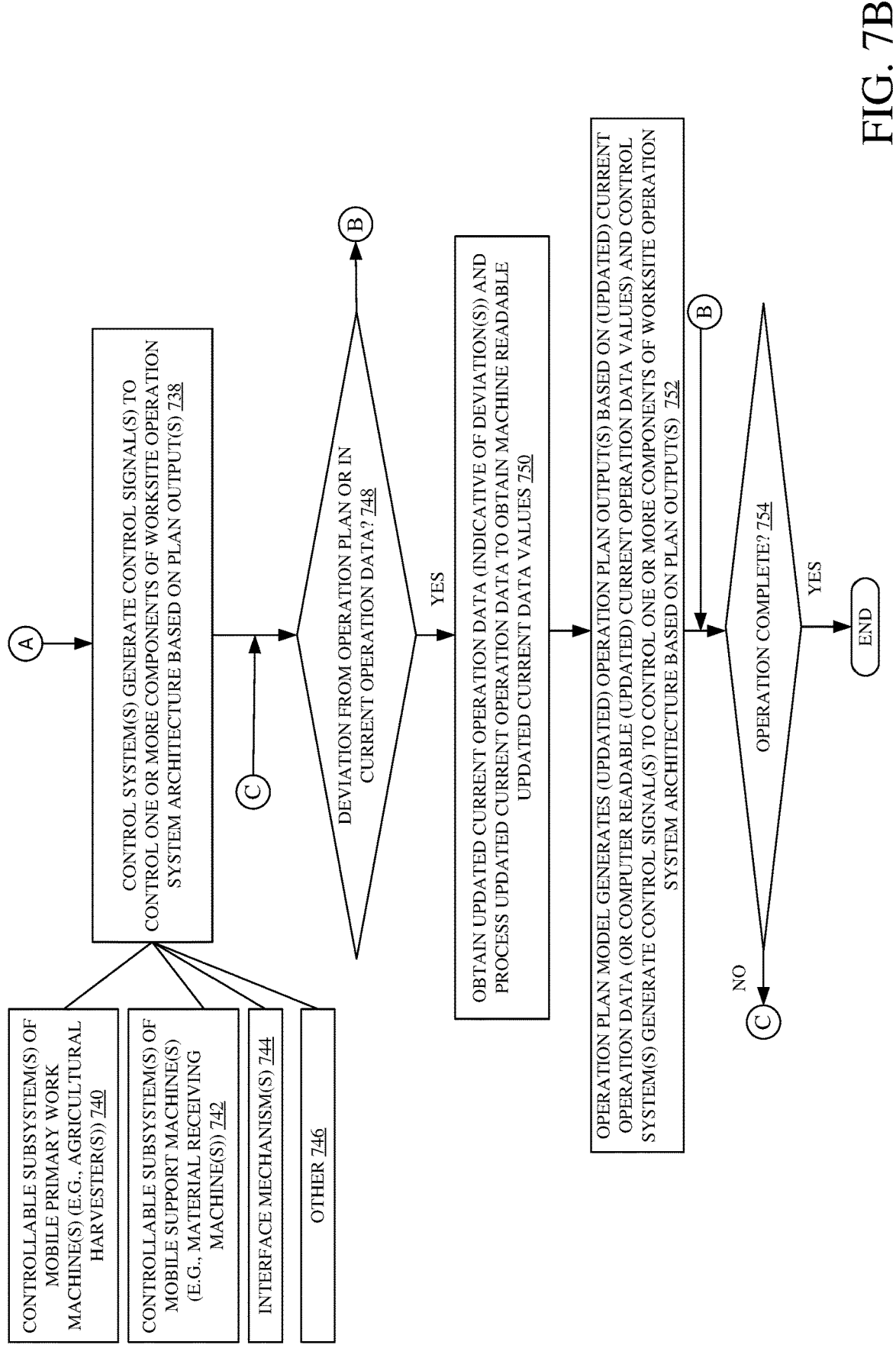

FIGS. 7A-7B (collectively referred to herein as FIG. 7) show a flow diagram illustrating an example operation 700 of agricultural worksite operation system 500 in generating one or plan outputs and control of one or more mobile agricultural work machines.

At block 702, historical operation data 501 for a plurality of historical operations (e.g., historical harvesting operations) is obtained. Historical operation data 501 can include historical machine data 504, as indicated by block 704. Historical operation data 501 can include historical worksite data 506, as indicated by block 706. Historical operation data 501 can include historical productivity data 508, as indicated by block 708. Historical operation data 501 can include historical logistics data 510, as indicated by block 710. Historical operation data 501 can include a variety of other historical operation data 512, as indicated by block 712.

At block 714, data processing system 330 processes the obtained historical operation data 501 to generate (or derive) computer readable historical operation data values, such as computer readable historical machine data values, computer readable historical worksite data values, computer readable historical productivity data values, historical logistics data values, and other computer readable historical operation data values.

At block 716, model generator 350 generates an operation plan model 352 based on the obtained historical operation data 501 (or the obtained computer readable historical operation data values). As previously explained, model generator 350 can utilize one or more machine learning, or AI, algorithms and iteratively repeat them on the obtained data, adjusting model parameters with each iteration, until model convergence. The operation plan model 352 is a trained and converged model.

At block 718, current operation data 502 is obtained. Current operation data can be relative to an operation currently underway or to an upcoming operation. Current operation data 502 can include current machine data 514, as indicated by block 720. Current operation data 502 can include current worksite data 516, as indicated by block 722. Current operation data 502 can include a variety of other current operation data 518, as indicated by block 724.

At block 726, data processing system 330 processes the obtained current operation data 501 to generate (or derive) computer readable current operation data values, such as computer readable current machine data values, computer readable current worksite data values, and other computer readable current operation data values.

At block 728, operation plan model 352 obtains, as model inputs, the obtained current operation data (or the computer readable current operation data values) and generates one or more operation plan outputs 360. An operation plan output 360 can include one or more sub-operation locations, as indicated by block 730. Sub-operation locations, in the example of a harvesting operation, can include one or more mobile grain cart unload locations (e.g., location(s) at which mobile grain cart(s) will receive material from agricultural harvester(s)) and one or more mobile grain trailer unload locations (e.g., location(s) at which mobile grain trailer(s) will receive material from mobile grain cart(s)). An operation plan output 360 can, additionally or alternatively, include one or more machine routes, as indicated by block

732. Machine routes, in the example of a harvesting operation, can include one or more harvest routes, which can each include an initial path (and location thereof), harvest passes (and locations thereof), turn pattern (e.g., turn pattern type and number of turns). Machine routes, in the example of a harvesting operation, can also include material receiving machine routes, such as mobile grain cart routes, which can include an initial path (and location thereof) as well as paths onto and off of the field and paths between machines (or between unload locations), and mobile grain trailer routes, which can include paths onto and off of the field and paths to and from unload locations. An operation plan output 360 can, additionally or alternatively, include one or more operation plan maps 358 (some examples of which are shown in FIGS. 5-6), as indicated by block 734. An operation plan output 360 can include any of a variety of other information, as indicated by block 736.

At block 738, one or more control systems (e.g., one or more control systems 414 or one or more control systems 214, or both) generate control signal(s) to control one or more components of system 500 based on the one or more plan outputs 360. Each, of one or more control systems 414, can control a corresponding one or more controllable subsystems 416 of a corresponding mobile primary work machine (e.g., harvester 101), as indicated by block 740. Each, of one or more control systems 214, can control a corresponding one or more controllable subsystems 216 of a corresponding mobile support machine (e.g., material receiving machine 201, such as a mobile grain cart or a mobile grain trailer), as indicated by block 742. A control system 414 or a control system 214, or another control system, can control one or more operator interface mechanisms to generate presentations (e.g., displays, etc.) based on (or indicative of) the one or more plan outputs 360, as indicated by block 744. For example, each, of one or more control systems 414, can control a corresponding one or more interface mechanisms 418 to generate presentation(s) to a corresponding operator 361. Additionally, or alternatively, each, of one or more control systems 214, can control a corresponding one or more interface mechanisms 218 to generate presentation(s) to a corresponding operator 361. Additionally, or alternatively, a control system 414, a control system 214, or another control system, can generate control signals to control one or more interface mechanisms 364 to generate presentation(s) to one or more users 366. These are merely examples, it will be understood that control signals can be generated to control various other items of system 500, as indicated by block 746.

At block 748 it is determined if there are any deviations in the operation plan (as defined by the plan output 360) or any deviations from the current operation data 502, or both. If there are no deviations, then processing proceeds to block 754. If there are deviations (whether from the operation plan or in the current operation data, or both), then processing proceeds to block 750.

At block 750, updated current operation data (indicative of deviation(s) at block 748) is obtained and processed, by data processing system 330, to obtain computer readable updated current operation data values. It will be understood that the updated current operation data (indicative of the deviation(s)) can come from any of a variety of sources include machine sensors (e.g., 408 or 208, or both), operator or user inputs, or various other sources.

At block 752, operation plan model 352 generates one or more operation outputs 360 (an update to the operation outputs 360 at block 728), based on the updated current operation data (or computer readable updated current operation data values), and one or more control systems (e.g., one or more control systems 414 or one or more control systems 214, or both) generate control signal(s) to control one or more components of system 500 based on the one or more plan outputs 360. The operation outputs 360 at block 752 can include similar (though potentially updated) items as those described at blocks 730, 732, 734, and 736. The control at block 752 can be similar to the control described at blocks 738, 740, 742, 744, and 746.

At block 754 it is determined if the currently underway operation is complete. If the currently underway operation is not complete, then processing returns to block 748. If the currently underway operation is complete, then processing ends.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores May be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, generators, models, controllers, components, and interactions. It will be appreciated that any or all of such systems, generators, models, controllers, components, and interactions may be implemented by hardware items, such as one or more processors, one or more processors executing computer executable instructions stored in memory, memory, or other processing components, some of which are described below, that perform the functions associated with those systems, generators, models, controllers, components, or interactions. In addition, any or all of the systems, generators, models, controllers, components, and interactions may be implemented by software that is loaded into a memory and is subsequently executed by one or more processors or one or more servers or other computing component(s), as described below. Any or all of the systems, generators, models, controllers, components, and interactions may also be implemented by different combinations of hardware, software, firmware, etc., some examples of which are described below. These are some examples of different structures that may be used to implement any or all of the systems, generators, models, logic, controllers, components, and interactions described above. Other structures may be used as well.

Figure 8:
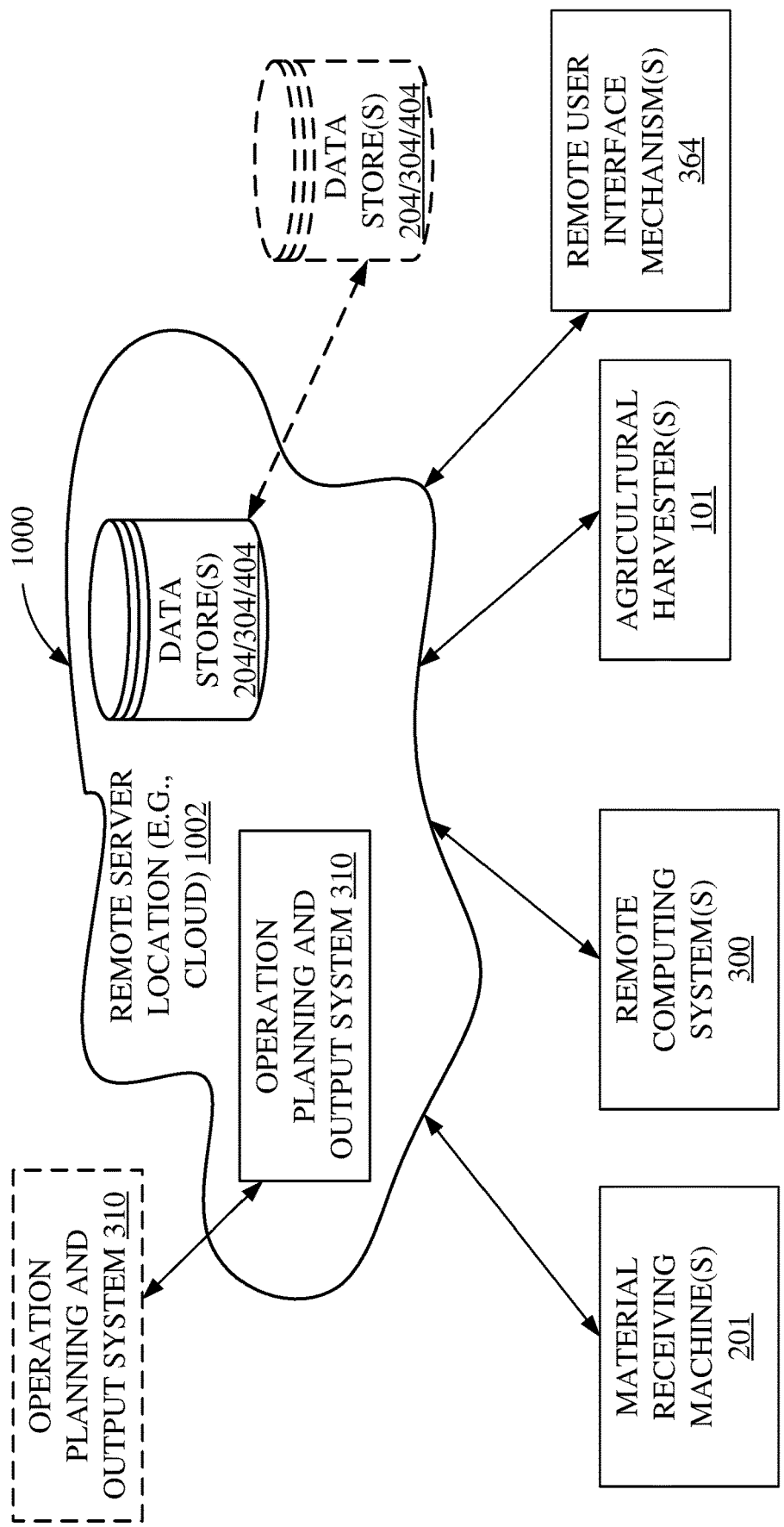
FIG. 8 is a block diagram showing one example of items of an agricultural worksite operation system architecture in communication with a remote server architecture.

FIG. 8 is a block diagram of a remote server architecture 1000. FIG. 8, also shows one or more agricultural harvesters 101, one or more material receiving machines 201, one or more remote computing systems 300, and one or more remote user interface mechanisms 364 in communication with the remote server environment. The agricultural harvesters 101, material receiving machines 201, remote computing systems 300, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 8, some items are similar to those shown in previous figures and those items are similarly numbered. FIG. 8 specifically shows that operation planning and output system 310, data stores 204, data stores 304, or data stores 404, or a combination thereof, may be located at a server location 1002 that is remote from the agricultural harvesters 101, material receiving machines 201, remote computing systems 300, and remote user interface mechanisms 364. Therefore, in the example shown in FIG. 8, agricultural harvesters 101, material receiving machines 201, remote computing systems 300, and remote user interface mechanisms 364 access systems through remote server location 1002. In other examples, various other items may also be located at server location 1002, such as various other items of worksite operation system architecture 500.

FIG. 8 also depicts another example of a remote server architecture. FIG. 8 shows that some elements of previous figures may be disposed at a remote server location 1002 while others may be located elsewhere. By way of example, one or more of data store(s) 204, 304, and may be disposed at a location separate from location 1002 and accessed via the remote server at location 1002. Similarly, operation planning and output system 310 may be disposed at a location separate from location 1002 and accessed via the remote server at location 1002. Regardless of where the elements are located, the elements can be accessed directly by agricultural harvesters 101, material receiving machines 201, remote computing systems 300, and remote user interface mechanisms 364 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As a mobile machine (e.g., agricultural harvester 101 or material receiving machine 201) comes close to the machine containing the information collection system, such as a fuel truck prior to fueling, the information collection system collects the information from the mobile machine (e.g., agricultural harvester 101 or material receiving machine 201) using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on a mobile machine (e.g., agricultural harvester 101 or material 16 receiving machine 201) until the mobile machine enters an area having wireless communication coverage. The mobile machine (e.g., agricultural harvester 101 or material receiving machine 201), itself, may send the information to another network.

It will also be noted that the elements of previous figures, or portions thereof, May be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 9:
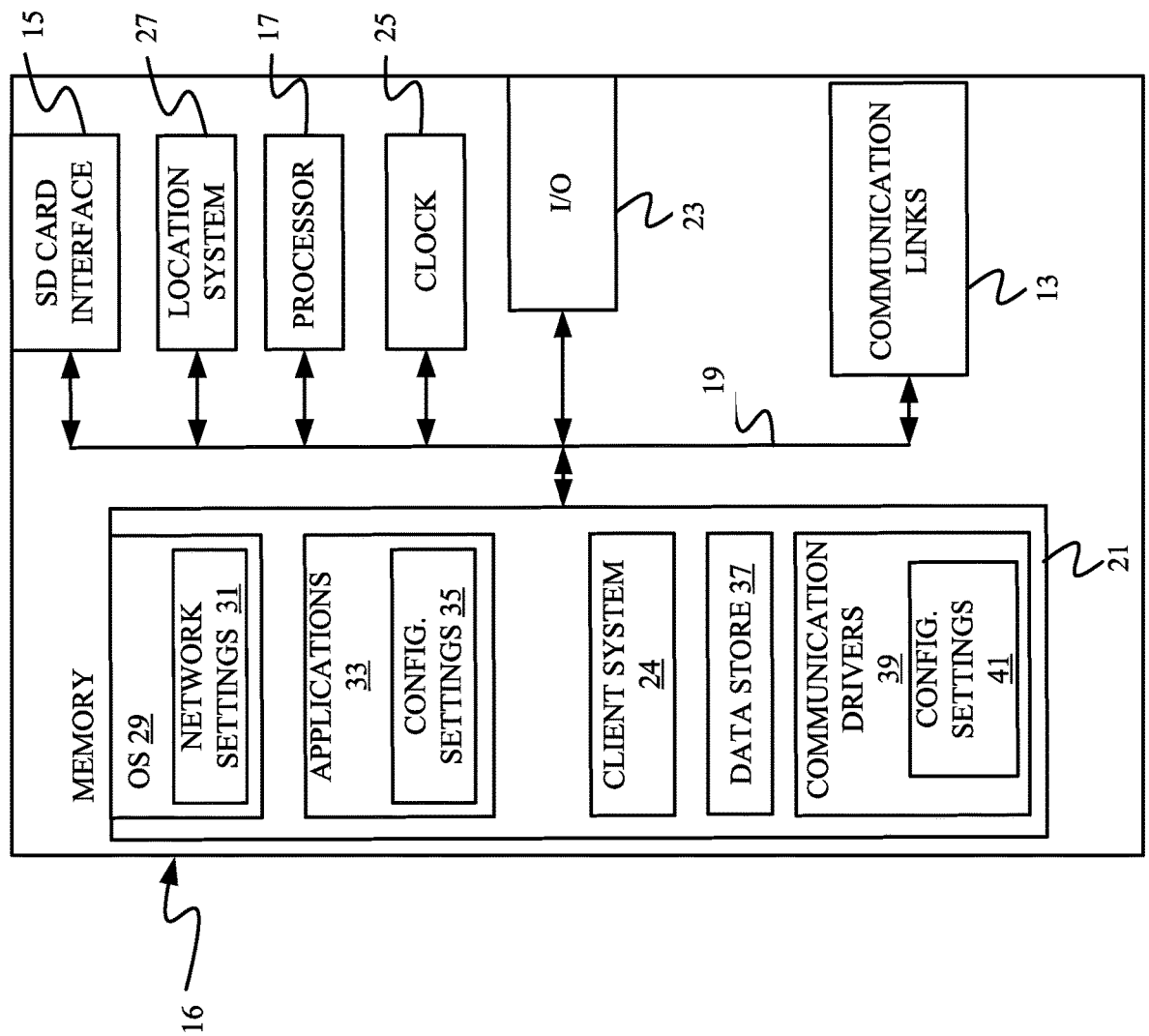
FIGS. 9-11 show examples of mobile devices that can be used in an agricultural worksite operation system architecture.
Figure 10:
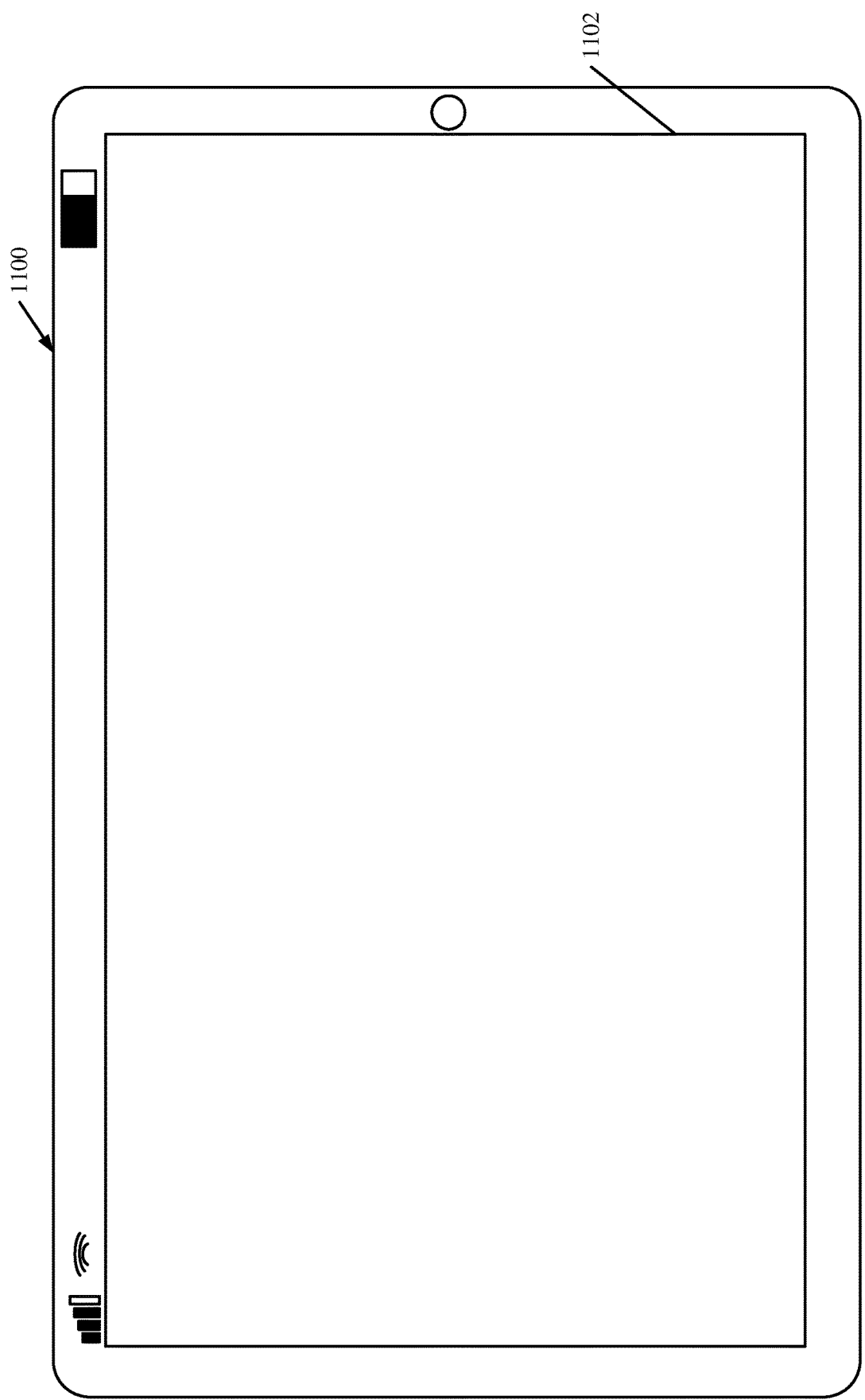
Figure 11:
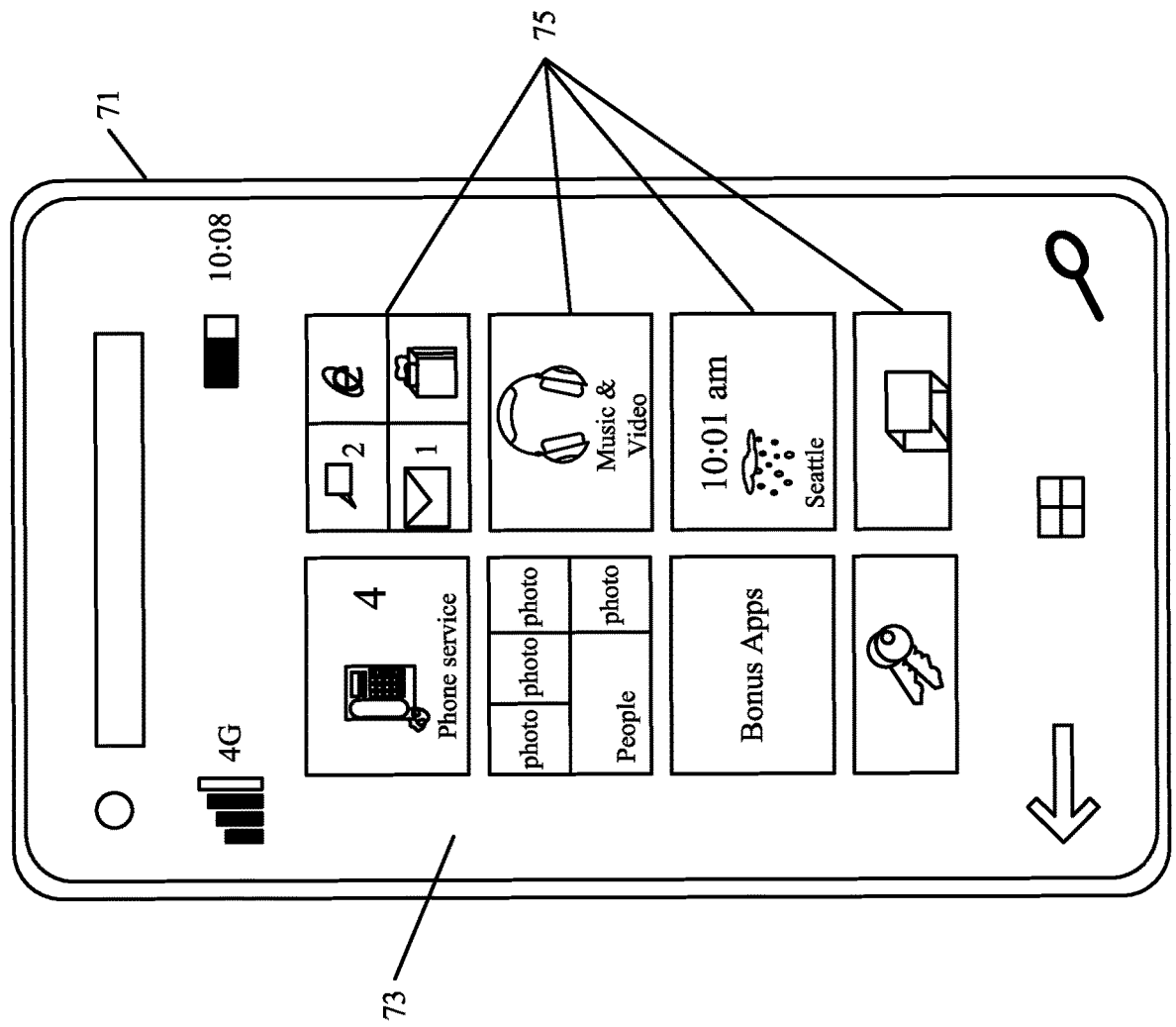

FIG. 9 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., agricultural harvester 101 or material receiving machine 201) for use in generating, processing, or displaying the outputs (e.g., 360) discussed above. FIGS. 10-11 are examples of handheld or mobile devices.

FIG. 9 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 10 shows one example in which device 16 is a tablet computer 1100. In FIG. 10, computer 1100 is shown with user interface display screen 1102. Screen 1102 can be a touch screen or a pen-enabled interface that receives inputs from a pen or stylus. Tablet computer 1100, May also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 11 is similar to FIG. 10 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
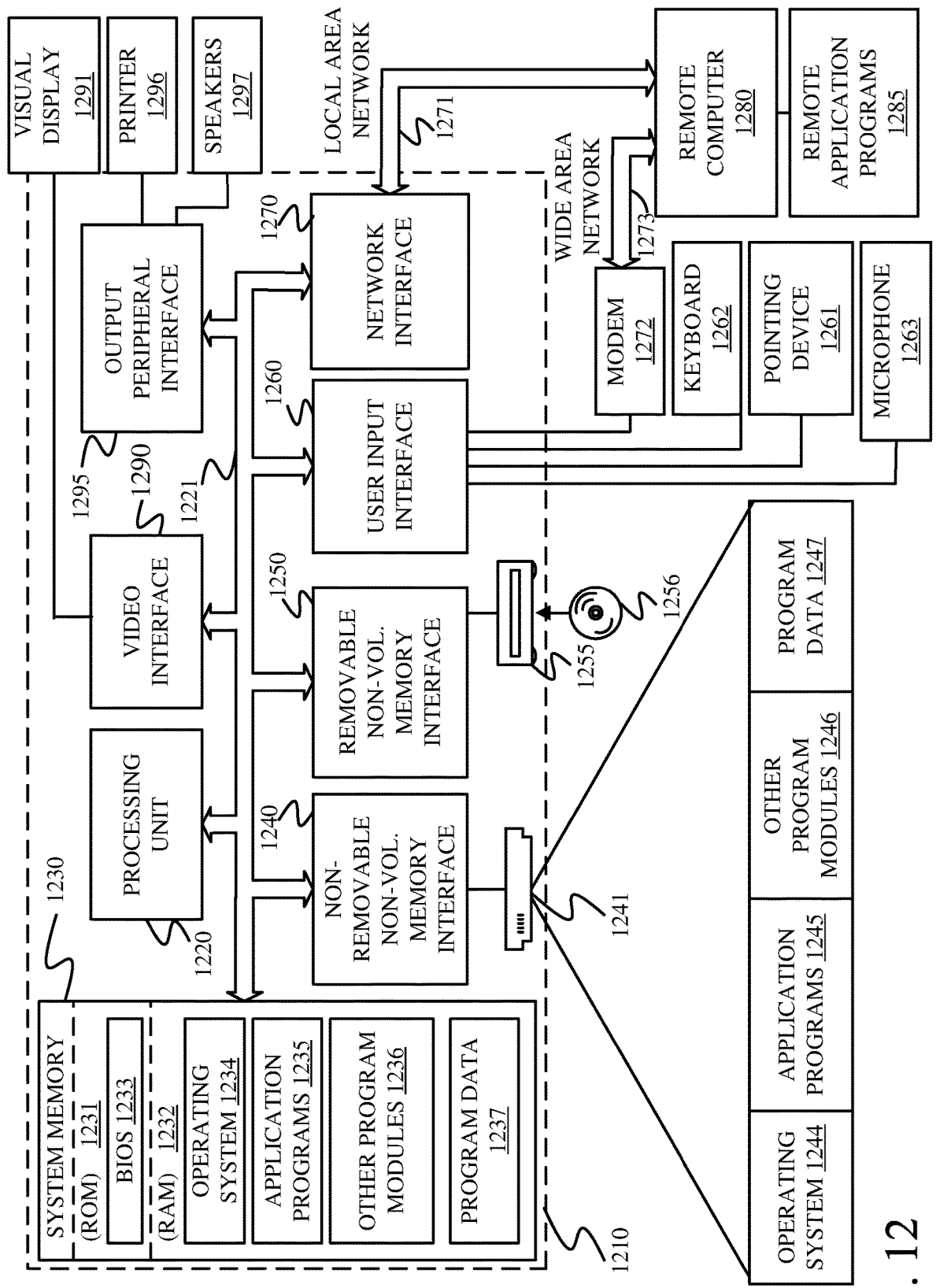
FIG. 12 is a block diagram showing one example of a computing environment that can be used in an agricultural worksite operation system architecture.

FIG. 12 is one example of a computing environment in which elements of previous figures described herein can be deployed. With reference to FIG. 12, an example system for implementing some embodiments includes a computing device in the form of a computer 1210 programmed to operate as discussed above. Components of computer 1210 may include, but are not limited to, a processing unit 1220 (which can comprise processors or servers from previous figures), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 12.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable volatile/nonvolatile computer storage media. By way of example only, FIG. 12 illustrates a hard disk drive 1241 that reads from or writes to non-removable, nonvolatile magnetic media, an optical disk drive 1255, and non-volatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), quantum computers, etc.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 12 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:
   one or more processors; and
   memory storing instructions, executable by the one or more processors, that, when executed by the one or more processors, cause the one or more processors to perform steps comprising:
   obtaining historical operation data relative to a plurality of historical operations, the historical operation data including historical machine data, historical worksite data, historical productivity data, and historical logistics data;
   obtaining current operation data relative to an underway or upcoming operation at a worksite, the current operation data including current machine data and current worksite data;
   generating an operation plan output relative to the underway or upcoming operation based on the obtained historical operation data and the obtained current operation data, the operation plan output including one or more of: (i) one or more machine routes; (ii) one or more sub-operation locations; (iii) one or more operation plan maps of the worksite; or a combination of (i), (ii), and (iii); and
   generating control signals to control one or more mobile agricultural work machines based on the operation plan output.

2. The agricultural system of claim 1, wherein the computer executable instructions, when executed by the one or more processors, further cause the one or more processors to perform a step comprising generating an operation plan model, based on the obtained historical data, and wherein generating the operation plan output comprises providing to the operation plan model, as model inputs, the current operation data, and generating, as a model output, one or more of: (i) the one or more machine routes; (ii) the one or more sub-operation locations; or a combination of (i) and (ii).

3. The agricultural system of claim 2, wherein generating the operation plan output further comprises generating (iii) the one or more operation plan maps of the worksite based, at least in part, on (i) the one or more machine routes or (ii) the one or more sub-operations, or a combination of (i) and (ii).

4. The agricultural system of claim 1, wherein the currently underway or upcoming operation is a currently underway harvesting operation or upcoming harvesting operation, wherein the one or more mobile agricultural work machines comprise one or more mobile agricultural harvesters and one or more material receiving machines, wherein the one or more mobile material receiving machines comprise one or more of: (iv) one or more mobile grain carts; (v) one or more mobile grain trailers; or a combination of (iv) and (v), wherein (i) the one or more machine routes include one or more harvest routes, corresponding to the one or more mobile agricultural harvesters, each harvest route including an initial harvest path and a turn pattern, and wherein (ii) the one or more sub-operation locations include one or more unloading locations, corresponding to the one or more material receiving machines.

5. The agricultural system of claim 4, wherein the one or more unloading locations include at least one mobile grain trailer unloading location indicative of a location at the worksite at which to position a mobile grain trailer to receive material.

6. The agricultural system of claim 4, wherein the historical operation data includes, for each historical operation of the plurality of historical operations, respective historical machine data, respective historical worksite data, respective historical productivity data, and historical respective logistics data;
   wherein each respective historical machine data comprises historical machine type and number data indicative of a number and type of mobile agricultural harvesters and a number and type of mobile material receiving machines that operated in the corresponding historical operation, and historical machine capacity data indicative of a grain carrying capacity of each agricultural harvester and each mobile material receiving machine that operated in the corresponding historical operation;
   wherein each respective historical worksite data comprises historical worksite dimension data indicative of dimensions of a worksite of the corresponding historical operation, historical worksite terrain data indicative of one or more terrain characteristics of the worksite of the corresponding historical operation, historical worksite features data indicative of presence and location of one or more worksite features of the worksite of the corresponding historical operation, and historical vegetation data indicative of one or more vegetation characteristics of the worksite of the corresponding historical operation;
   wherein each respective historical productivity data comprises at least one historical productivity metric of the corresponding historical operation; and
   wherein each respective historical logistics data comprises one or more historical harvest routes and one or more historical unloading locations of the corresponding historical operation.

7. The agricultural system of claim 6, wherein the current machine data comprises current machine type and number data indicative of a number and type of mobile agricultural harvesters and a number and type of mobile material receiving machines that are operating in the currently underway harvesting operation or are to operate in the upcoming harvesting operation, and current machine capacity data indicative of a grain carrying capacity of each agricultural harvester and each mobile material receiving machine that are operating in the currently underway harvesting operation or are to operate in the upcoming harvesting operation; and
   wherein the current worksite data comprises current worksite dimension data indicative of dimensions of the worksite, current worksite terrain data indicative of one or more terrain characteristics of the worksite, current worksite features data indicative of presence and location of one or more worksite features of the worksite, and current vegetation data indicative of one or more vegetation characteristics of the worksite.

8. The agricultural system of claim 4, wherein the control signals control one or more controllable subsystems, wherein each controllable subsystem corresponds to one of: (vi) a mobile agricultural harvester of the one or more agricultural harvesters; or (vii) a mobile material receiving machine of the one or more mobile material receiving machines.

9. A computer implemented method of controlling one or more mobile agricultural work machines, the computer implemented method comprising:
   obtaining historical operation data relative to a plurality of historical operations, the historical operation data including historical machine data, historical worksite data, historical productivity data, and historical logistics data;
   obtaining current operation data relative to an underway or upcoming operation, the current operation data including current machine data and current worksite data;
   generating, based on the obtained historical operation data and the obtained current operation data, an operation plan output relative to the underway or upcoming operation, the operation plan output including one or more of: (i) one or more machine routes; (ii) one or more sub-operation locations; (iii) one or more operation plan maps; or a combination of (i), (ii), and (iii); and
   generating control signals to control the one or more mobile agricultural work machines based on the operation plan output.

10. The computer implemented method of claim 9 and further comprising generating an operation plan model, based on the obtained historical data; and
    wherein generating the operation plan output comprises providing to the operation plan model, as model inputs, the current operation data, and generating, as a model output, one or more of: (i) the one or more machine routes; (ii) the one or more sub-operation locations; or a combination of (i) and (ii).

11. The computer implemented method of claim 10, wherein generating the operation plan output further comprises generating the (iii) the one or more operation plan maps of the worksite based, at least in part, on (i) the one or more machine routes or (ii) the one or more sub-operations, or a combination of (i) and (ii).

12. The computer implemented method of claim 9, wherein obtaining the current operation data comprises obtaining, as the current operation data, current operation data relative to, as the underway or upcoming operation, an underway or upcoming harvesting operation, including current machine data relative to the underway or upcoming harvesting operation and current worksite data relative to the underway or current harvesting operation,
    wherein generating the control signals comprises generating the control signals to control, as the one or more agricultural work machines, one or more mobile agricultural harvesters and one or more material receiving machines, the one or more material receiving machines comprising one or more of: (iv) one or more mobile grain carts; (v) one or more mobile grain trailers; or a combination of (iv) and (v); and
    wherein generating the operation plan comprises generating the operation plan including, as (i) the one or more machine routes, one or more harvest routes, corresponding to the one or more mobile agricultural harvesters, each harvest route including an initial harvest path and a turn pattern, and including, as (ii) the one or more sub-operation locations, one or more unloading locations corresponding to the one or more material receiving machines.

13. The agricultural system of claim 12, wherein generating the operation plan comprises generating the operation plan including, as the one or more unloading locations, at least one mobile grain trailer unloading location indicative of a location at the worksite at which to position a mobile grain trailer to receive material.

14. The agricultural system of claim 12, wherein obtaining the historical operation data comprise obtaining, as the historical operation data, historical operation data including, for each historical operation of the plurality of historical operations, respective historical machine data, respective historical worksite data, respective historical productivity data, and historical respective logistics data;

wherein obtaining the historical operation data comprises obtaining the historical operation data including, as the respective historical machine data for each historical operation, historical machine type and number data indicative of a number and type of mobile agricultural harvesters and a number and type of mobile material receiving machines that operated in the corresponding historical operation, and historical machine capacity data indicative of a grain carrying capacity of each agricultural harvester and each mobile material receiving machine that operated in the corresponding historical operation;

wherein obtaining the historical operation data comprises obtaining the historical operation data including, as the respective historical worksite data for each historical operation, historical worksite dimension data indicative of dimensions of a worksite of the corresponding historical operation, historical worksite terrain data indicative of one or more terrain characteristics of the worksite of the corresponding historical operation, historical worksite features data indicative of presence and location of one or more worksite features of the worksite of the corresponding historical operation, and historical vegetation data indicative of one or more vegetation characteristics of the worksite of the corresponding historical operation;

wherein obtaining the historical operation data comprises obtaining the historical operation data including, as the respective historical productivity data for each historical operation, at least one historical productivity metric of the corresponding historical operation; and wherein obtaining the historical operation data comprises obtaining the historical operation data including, as the respective historical logistics data for each historical operation, one or more historical harvest routes and one or more historical unloading locations of the corresponding historical operation.

15. The agricultural system of claim 14, wherein obtaining the current operation data comprises obtaining the current operation data including, as the current machine data, current machine type and number data indicative of a number and type of mobile agricultural harvesters and a number and type of mobile material receiving machines that are operating in the currently underway harvesting operation or are to operate in the upcoming harvesting operation, and current machine capacity data indicative of a grain carrying capacity of each agricultural harvester and each mobile material receiving machine that are operating in the currently underway harvesting operation or are to operate in the upcoming harvesting operation; and wherein obtaining the current operation data comprises obtaining the current operation data including, as the current worksite data, current worksite dimension data indicative of dimensions of the worksite, current worksite terrain data indicative of one or more terrain characteristics of the worksite, current worksite features data indicative of presence and location of one or more worksite features of the worksite, and current vegetation data indicative of one or more vegetation characteristics of the worksite.

16. The agricultural system of claim 14, wherein generating the control signals comprises generating, as the control signals, control signals that control one or more controllable subsystems, wherein each controllable subsystem corresponds to one of: (vi) a mobile agricultural harvester of the one or more agricultural harvesters; or (vii) a mobile material receiving machine of the one or more mobile material receiving machines.

17. An agricultural harvesting system comprising:
one or more processors; and
memory storing instructions, executable by the one or more processors, that, when executed by the one or more processors, cause the one or more processors to perform steps comprising:
obtaining historical operation data relative to a plurality of historical harvesting operations, the historical operation data including historical machine data, historical worksite data, historical productivity data, and historical logistics data;
obtaining current operation data relative to an underway or upcoming harvesting operation at a worksite, the current operation data including current machine data and current worksite data;
generating an operation plan output relative to the underway or upcoming harvesting operation based on the obtained historical operation data and the obtained current operation data, the operation plan output including one or more of: (i) one or more harvest routes; (ii) one or more unloading locations; (iii) one or more operation plan maps of the worksite; or a combination of (i), (ii), and (iii); and
generating, based on the operation plan output, control signals to control one or more of: (iv) one or more mobile agricultural harvesters; (v) one or more material receiving machines, or a combination of (iv) and (v).

18. The agricultural harvesting system of claim 17, wherein the computer executable instructions, when executed by the one or more processors, further cause the one or more processors to perform a step comprising generating an operation plan model, based on the obtained historical data,
wherein generating the operation plan output comprises providing to the operation plan model, as model inputs, the current operation data, and generating, as a model output, one or more of: (i) the one or more harvest routes; (ii) the one or more unloading locations; or a combination of (i) and (ii) and generating (iii) the one or more operation plan maps of the worksite based, at least in part, on (i) the one or more harvest route or (ii) the one or more unloading locations, or a combination of (i) and (ii).

19. The agricultural harvesting system of claim 17, wherein the control signals control one or more controllable subsystems, wherein each controllable subsystem corresponds to one of: (vi) a mobile agricultural harvester of the one or more agricultural harvesters; or (vii) a mobile material receiving machine of the one or more mobile material receiving machines.

20. The agricultural harvesting system of claim 17, wherein the control signals control one or more controllable subsystems of each of the one or more agricultural harvesters and each of the one or more material receiving machines.

* * * * *